(12) United States Patent
Papamanthou et al.

(10) Patent No.: US 8,572,385 B2
(45) Date of Patent: Oct. 29, 2013

(54) SYSTEM AND METHOD FOR OPTIMAL VERIFICATION OF OPERATIONS ON DYNAMIC SETS

(75) Inventors: Charalampos Papamanthou, Berkeley, CA (US); Roberto Tamassia, Providence, RI (US); Nikolaos Triandopoulos, Arlington, MA (US)

(73) Assignees: Brown University, Providence, RI (US); Boston University, Boston, MA (US)

( * ) Notice: Subject to any disclaimer, the term of this patent is extended or adjusted under 35 U.S.C. 154(b) by 0 days.

(21) Appl. No.: 13/194,702

(22) Filed: Jul. 29, 2011

(65) Prior Publication Data

US 2012/0030468 A1 Feb. 2, 2012

Related U.S. Application Data

(60) Provisional application No. 61/368,913, filed on Jul. 29, 2010.

(51) Int. Cl.
*H04L 9/32* (2006.01)

(52) U.S. Cl.
USPC .......................................................... 713/171

(58) Field of Classification Search
USPC .................................................. 713/171, 168
See application file for complete search history.

(56) References Cited

U.S. PATENT DOCUMENTS

| | | | | |
|---|---|---|---|---|
| 8,213,615 B2* | 7/2012 | Tavernier et al. | | 380/255 |
| 2006/0107070 A1* | 5/2006 | Rice et al. | | 713/190 |
| 2008/0183656 A1* | 7/2008 | Perng et al. | | 707/2 |
| 2008/0195583 A1* | 8/2008 | Hsu et al. | | 707/3 |
| 2009/0041253 A1* | 2/2009 | Chen et al. | | 380/282 |
| 2010/0132036 A1* | 5/2010 | Hadjieleftheriou et al. | | 726/22 |
| 2010/0185847 A1* | 7/2010 | Shasha et al. | | 713/150 |
| 2011/0225429 A1* | 9/2011 | Papamanthou et al. | | 713/189 |
| 2012/0002811 A1* | 1/2012 | Smart | | 380/255 |
| 2012/0159155 A1* | 6/2012 | Brickell et al. | | 713/155 |

OTHER PUBLICATIONS

Singh et al., "Ensuring Correctness over Untrusted Private Database", 2008, ACM, pp. 476-486.*
Pang et al., "Scalable Verification for Outsourced Dynamic Databases", 2009, ACM, pp. 802-813.*
Pang et al., "Verifying Completeness of Relational Query Results in Data Publishing", 2005, ACM, pp. 407-418.*

(Continued)

*Primary Examiner* — Matthew Smithers
(74) *Attorney, Agent, or Firm* — Barlow, Josephs & Holmes, Ltd.

(57) ABSTRACT

A system and method for cryptographically checking the correctness of outsourced set operations performed by an untrusted server over a dynamic collection of sets that are owned (and updated) by a trusted source is disclosed. The system and method provides new authentication mechanisms that allow any entity to publicly verify a proof attesting the correctness of primitive set operations such as intersection, union, subset and set difference. Based on a novel extension of the security properties of bilinear-map accumulators as well as on a primitive called accumulation tree, the system and method achieves optimal verification and proof complexity, as well as optimal update complexity, while incurring no extra asymptotic space overhead. The method provides an efficient proof construction, adding a logarithmic overhead to the computation of the answer of a set-operation query. Applications of interest include efficient verification of keyword search and database queries.

39 Claims, 17 Drawing Sheets

(56) References Cited

OTHER PUBLICATIONS

B. Applebaum, Y. Ishai, and E. Kushilevitz, "From Secrecy to Soundness: Efficient Verification via Secure Computation". IN: Int. Colloquium on Automata, Languages and Programming (ICALP), pp. 152-163, 2010.

M. J. Atallah, Y. Cho, and A. Kundu, "Efficient Data Authentication in an Environment of Untrusted Third-Party Distributors". IN: Int. Conference on Data Engineering (ICDE), pp. 696-704, 2008.

M. H. Au, P. P. Tsang, W. Susilo, and Y. Mu, "Dynamic Universal Accumulators for DDH Groups and Their Application to Attribute-Based Anonymous Credential Systems". IN: RSA, Cryptographers' Track (CT-RSA), pp. 295-308, 2009.

R. Baeza-Yates and B. Ribeiro-Neto, "Modern Information Retrieval" Addison-Wesley Publishing Company, Reading, Mass., 1999.

M. Bellare and D. Micciancio, "A New Paradigm for Collision-Free Hashing: Incrementality at Reduced Cost" IN: Advances in Cryptology (EUROCRYPT), pp. 163-192, 1997.

S. Benabbas, R. Gennaro, and Y. Vahlis, "Verifiable Delegation of Computation over Large Datasets" IN: Int. Cryptology Conference (CRYPTO), 2011.

M. Blum, W. S. Evans, P. Gemmell, S. Kannan, and M. Naor, "Checking the Correctness of Memories", Algorithmica, Springer-Verlag New York Inc., 12(2/3):225-244, 1994.

D. Boneh and X. Boyen, "Short Signatures Without Random Oracles and the SDH Assumption in Bilinear Groups", Journal of Cryptology, International Association for Cryptologic Research, 21:(2):149-177, 2008.

D. Boneh and B. Waters, "Conjunctive, Subset, and Range Queries on Encrypted Data". IN: Theoretical Cryptography Conference (TCC), pp. 535-554, 2007.

S. Canard and A. Gouget, "Multiple Denominations in E-cash with Compact Transaction Data", IN: Financial Cryptography (FC), pp. 82-97, 2010.

K-M Chung, Y. T. Kalai, F-H Liu and R. Raz, "Memory Delegation", IN: Int. Cryptology Conference (CRYPTO), 2011.

K-M Chung, Y. Kalai and S. Vadhan, "Improved Delegation of Computation Using Fully Homomorphic Encryption", IN: Int. Cryptology Conference (CRYPTO), pp. 483-501, 2010.

I. Damgard and N. Triandopoulos, "Supporting Non-membership Proofs with Bilinear-map Accumulators", Cryptology ePrint Archive, Report 2008/538, 2008 http://eprint.iacr.org/.

C. Dwork, M. Naor, G. N. Rothblum, and V. Vaikuntanathan, "How Efficient Can Memory Checking Be?", IN: Theoretical Cryptography Conference (TCC), pp. 503-520, 2009.

M. J. Freedman, K. Nissim, and B. Pinkas, "Efficient Private Matching and Set Intersection", IN: Advances in Cryptology (EUROCRYPT), pp. 1-19, 2004.

R. Gennaro, C. Gentry, and B. Parno, "Non-interactive Verifiable Computing: Outsourcing Computation to Untrusted Workers", IN: Int. Cryptology Conference (CRYPTO), pp. 465-482, 2010.

M. T. Goodrich, R. Tamassia, and J. Hasic, "An Efficient Dynamic and Distributed Cryptographic Accumulator", IN: Information Security Conference (ISC), pp. 372-388, 2002.

M. T. Goodrich, R. Tamassia, and A. Schwerin, "Implementation of an Authenticated Dictionary with Skip Lists and Commutative Hashing", IN: DARPA Information Survivability Conference and Exposition II (DISCEX II), pp. 68-82, 2001.

M. T. Goodrich, R. Tamassia, and N. Triandopoulos, "Super-Efficient Verification of Dynamic Outsourced Databases", IN: RSA, Cryptographers Track (CT-RSA), pp. 407-424, 2008.

M. T. Goodrich, R. Tamassia, and N. Triandopoulos, "Efficient Authenticated Data Structures for Graph Connectivity and Geometric Search Problems", Algorithmica, 60(3):505-552, 2011.

D. Kratsch, R. M. McConnell, K. Mehlhorn, and J. P. Spinrad, "Certifying Algorithms for Recognizing Interval Graphs and Permutation Graphs", IN: Symposium on Discrete Algorithms (SODA), pp. 158-167, 2003.

J. Li, N. Li, and R. Xue, "Universal Accumulators with Efficient Nonmenbership Proofs", IIN: Applied Cryptography and Network Security (ACNS), pp. 253-269, 2007.

C Martel, G. Nuckolls, P. Devanbu, M. Geretz, A. Kwong, and S. G. Stubblebine, "A General Model for Authenticated Data Structures", Algorithmica, 39(1):23-41, 2004.

R. C. Merkle, "A Certified Digital Signature", IN: Int. Cryptology Conference (CRYPTO), pp. 218-238, 1989.

Y. Minsky, A. Trachtenberg, and R. Zippel, "Set Reconciliation With Nearly Optimal Communication Complexity", IEEE Transactions on Information Theory, 49(9):2213-2218, 2003.

R. Morselli, S. Bhattacharjee, J. Katz, and P. J. Kelcher, "Trust-Preserving Set Operations", IN: Int. Conference on Computer Communications (INFOCOM), 2004.

M. Naor and K. Nissim, "Certificate Revocation and Certificate Update", IN: USENIX Security Symposium, pp. 217-228, 1998.

L. Nguyen, "Accumulators from Bilinear Pairings and Applications", IN: RSA, Cryptographers' Track (CT-RSA), pp. 275-292, 2005.

H. Pang and K.-L. Tan, "Authenticating Query Results in Edge Computing", IN: Int. Conference on Data Engineering (ICDE), pp. 560-571, 2004.

C. Papamanthou and R. Tamassia, "Time and Space Efficient Algorithms for Two-Party Authenticated Data Structures", IN: Int. Conference on Information and Communications Security (ICICS), pp. 1-16, 2007.

C. Papamanthou and R. Tamassia, "Cryptography for Efficiency: Authenticated Data Structures Based on Lattices and Parallel Online Memory Checking", Cryptology ePrint Archive, Report 2011/102, 2011, http://eprint.iacr.org/.

C. Papamanthou, R. Tamassia, and N. Triandopoulos, "Authenticated Hash Tables", IN: Int. Conference on Computer and Communications Security (CCS), pp. 437-448, 2008.

C. Papamanthou, R. Tamassia, and N. Triandopoulos, "Optimal Authenticated Data Structures with Multilinear Forms", IN: Int. Conference on Pairing-Based Cryptography (PAIRING), pp. 246-264, 2010.

F. P. Preparata and D. V. Sarwate, "Computational complexity of Fourier Transforms Over Finite Fields", Mathematics of Computation, 31(139):pp. 740-751, 1977.

R. Tamassia, "Authenticated Data Structures", IN: European Symp. on Algorithms (ESA), pp. 2-5, 2003.

R. Tamassia and N. Triandopoulos, "Certification and Authentication of Data Structures", IN: Alberto Mendelzon Workshop on Foundations of Data Management, 2010.

Y. Yang, D. Papadias, S. Papadopoulos, and P. Kalnis, "Authenticated Join Processing in Outsourced Databases", IN: Int. Conf. on Management of Data (SIGMOD), pp. 5-18, 2009.

M. L. Yiu, Y. Lin and K. Mouratidis, "Efficient Verification of Shortest Path Search via Authenticated Hints", IN: Int. Conference on Data Engineering (ICDE), pp. 237-248, 2010.

* cited by examiner

- For timestamped documents, use segment tree over the time dimension (N timestamps)
- Search interval covered by O(log N) canonical intervals in the segment tree, each corresponding to a set of documents $T_j$
- Timestamped keyword search equivalent to O(log N) set intersections
  - $T_1 \cap S_1 \cap S_2 ... \cap S_t$
  - $T_2 \cap S_1 \cap S_2 ... \cap S_t$
  - ...

Authenticated sets collection

- Source owns a collection of sets $S_1, S_2, \ldots, S_m$

Authenticated sets collection

- Source owns a collection of sets $S_1, S_2, ..., S_m$
- Source builds authenticated data structure for the collection

Authenticated sets collection

- Source owns a collection of sets $S_1, S_2, \ldots, S_m$
- Source builds authenticated data structure for the collection
- Source sends collection and authenticated data structure to server

First solution: hashing

- Two-level tree structure and hierarchical cryptographic hashing
- Space: $O(m + M)$, where $M$ is the sum of set sizes
- Intersection of two sets of size $n$: $O(n + \log m)$ proof size and verification time
- Update: $O(\log m + \log n)$ time
- Security: collision resistance

SYSTEM AND METHOD FOR OPTIMAL VERIFICATION OF OPERATIONS ON DYNAMIC SETS

1 CROSS-REFERENCE TO RELATED APPLICATION

This application claims priority to earlier filed U.S. Provisional Application Ser. No. 61/368,913, filed Jul. 29, 2010, the contents of which are incorporated herein by reference.

2 STATEMENT REGARDING FEDERALLY SPONSORED RESEARCH OR DEVELOPMENT

This invention was made with government support under grants CNS-1012060 and CNS-1012798 awarded by the U.S. National Science Foundation. The government has certain rights in the invention.

3 BACKGROUND OF THE INVENTION

3.1 Field of the Invention

The present patent document relates generally to verification of data returned in a search query and more particularly to a method and system for verifying the results of a search query performed on a finite set of data stored on an untrusted server.

3.2 Background of the Related Art

Providing integrity guarantees in third-party data management settings is an active area of research, especially in view of the growth in usage of cloud computing. In such settings, verifying the correctness of outsourced computations performed over remotely stored data becomes a crucial property for the trustworthiness of cloud services. Such a verification process should incur minimal overheads to the clients or otherwise the benefits of computation outsourcing are dismissed; ideally, computations should be verified without having to locally rerun them or to utilize too much extra cloud storage.

In this paper, we study the verification of outsourced operations on general sets and consider the following problem. Assuming that a dynamic collection of m sets $S_1, S_2, \ldots, S_m$ is remotely stored at an untrusted server, we wish to publicly verify basic operations on these sets, such as intersection, union and set difference. For example, for an intersection query of t sets specified by indices $1 \leq i_1, i_2, \ldots, i_t \leq m$, we aim at designing techniques that allow any client to cryptographically check the correctness of the returned answer $1 = S_{i_1} \cap S_{i_2} \cap \ldots \cap S_{i_t}$. Moreover, we wish the verification of any set operation to be operation-sensitive, meaning that the resulting complexity depends only on the (description and outcome of the) operation, and not on the sizes of the involved sets. That is, if $\delta = |1|$ is the answer size then we would like the verification cost to be proportional to $t+\delta$, and independent of m or $\Sigma_i |S_i|$; note that work at least proportional to $t+\delta$ is needed to verify any such query's answer. Applications of interest include keyword search and database queries, which boil down to set operations.

Relation to verifiable computing. Recent works on verifiable computing [1 12, 16] achieve operation-sensitive verification of general functionalities, thus covering set operations as a special case. Although such approaches clearly meet our goal with respect to optimal verifiability, they are inherently inadequate to meet our other goals with respect to public verifiability and dynamic updates, both important properties in the context of outsourced data querying. Indeed, to outsource the computation as an encrypted circuit, the works in [1, 12, 16] make use of some secret information which is also used by the verification algorithm, thus effectively supporting only one verifier; instead, we seek for schemes that allow any client (knowing only a public key) to query the set collection and verify the returned results. Also, the description of the circuit in these works is fixed at the initialization of the scheme, thus effectively supporting no updates in the outsourced data; instead, we seek for schemes that are dynamic. In other scenarios, but still in the secret-key setting, protocols for general functionalities and polynomial evaluation have recently been proposed in [1] and [6] respectively.

Aiming at both publicly verifiable and dynamic solutions, we study set-operation verification in the model of authenticated data structures (ADSs). A typical setting in this model, usually referred to as the three-party model [36], involves protocols executed by three participating entities. A trusted party, called source, owns a data structure (here, a collection of sets) that is replicated along with some cryptographic information to one or more untrusted parties, called servers. Accordingly, clients issue data-structure queries to the servers and are able to verify the correctness of the returned answers, based only on knowledge of public information which includes a public key and a digest produced by the source (e.g., the root hash of a Merkle tree, see FIG. 10).[1] Updates on the data structure are performed by the source and appropriately propagated by the servers. Variations of this model include: (i) a two-party variant (e.g., [30]), where the source keeps only a small state (i.e., only a digest) and performs both the updates/queries and the verifications—this model is directly comparable to the model of verifiable computing; (ii) the memory checking model [7], where read/write operations on an array of memory cells is verified—however, the absence of the notion of proof computation in memory checking (the server is just a storage device) as well as the feature of public verifiability in authenticated data structures make the two models fundamentally different.[2]

[1] Conveying the trust clients have in the source, the authentic digest is assumed to be publicly available; in practice, a time-stamped and digitally signed digest is outsourced to the server.

[2] Indeed, memory checking might require secret memory, e.g., as in the PRF construction in [7].

Achieving operation-sensitive verification. In this work, we design authenticated data structures for the verification of set operations in an operation-sensitive manner, where the proof and verification complexity depends only on the description and outcome of the operation and not on the size of the involved sets. Conceptually, this property is similar to the property of super-efficient verification that has been studied in certifying algorithms [21] and certification data structures [19, 37], which is achieved as well as in the context of verifiable computing [1, 12, 16], where an answer can be verified with complexity asymptotically less than the complexity required to produce it. Whether the above optimality property is achievable for set operations (while keeping storage linear) was posed as an open problem in [23]. We close this problem in the affirmative.

All existing schemes for set-operation verification fall into the following two rather straightforward and highly inefficient solutions. Either short proofs for the answer of every possible set-operation query are precomputed allowing for optimal verification at the client at the cost of exponential storage and update overheads at the source and the server—an undesirable trade-off, as it is against storage outsourcing. Or integrity proofs for all the elements of the sets involved in the query are given to the client who locally verifies the query result: in this case the verification complexity can be linear in the problem size—an undesirable feature, as it is against computation outsourcing.

4 SUMMARY OF THE INVENTION

We achieve optimal verification by departing from the above approaches as follows. We first reduce the problem of verifying set operations to the problem of verifying the validity of some more primitive relations on sets, namely subset containment and set disjointness. Then for each such primitive relation we employ a corresponding cryptographic primitive to optimally verify its validity. In particular, we extend the bilinear-map accumulator to optimally verify subset containment (Lemmas 1 and 4), inspired by [32]. We then employ the extended Euclidean algorithm over polynomials (Lemma5) in combination with subset containment proofs to provide a novel optimal verification test for set disjointness. The intuition behind our technique is that disjoint sets can be represented by polynomials mutually indivisible, therefore there exist other polynomials so that the sum of their pair wise products equals to one—this is the test to be used in the proof. Still, transmitting (and processing) these polynomials is bandwidth (and time) prohibitive and does not lead to operation-sensitive verification. Bilinearity properties, however, allow us to compress their coefficients in the exponent and, yet, use them meaningfully, i.e., compute an internal product. This is why although a conceptually simpler RSA accumulator [5] would yield a mathematically sound solution, a bilinear-map accumulator [28] is essential for achieving the desired complexity goal.

We formally describe our protocols using an authenticated data structure scheme or ADS scheme (Definition 1). An ADS scheme consists of algorithms {genkey, setup, update, refresh, query, verify} such that: (i) genkey produces the secret and public key of the system; (ii) on input a plain data structure D, setup initializes the authenticated data structure auth(D); (iii) having access to the secret key, update computes the updated digest of auth(D); (iv) without having access to the secret key, refresh updates auth(D); (v) query computes cryptographic proofs Π(q) for answers α(q) to data structure queries q; (vi) verify processes a proof Π and an answer α and either accepts or rejects. Note that neither query nor verify have access to the secret key, thus modeling computation outsourcing and public verifiability. An ADS scheme must satisfy certain correctness and security properties (Definitions2 and 3). We note that protocols in both the three-party and the two-party models can be realized via an ADS scheme.

Our main result, Theorem 1, presents the first ADS scheme to achieve optimal verification of the set operations intersection, union, subset and set difference, as well as optimal updates on the underlying collection of sets. Our scheme is proved secure under the bilinear extension of the q-strong Diffie-Hellman assumption (see, e.g., [8]).

Complexity model. To explicitly measure complexity of various algorithms with respect to number of primitive cryptographic operations, without considering the dependency on the security parameter, we adopt the complexity model used in memory checking [7, 14], which has been only implicitly used in ADS literature. The access complexity of an algorithm is defined as the number of memory accesses performed during its execution on the authenticated data structure that is stored in an indexed memory of n cells.[3] E.g., a Merkle tree [24] has O(log n) update access complexity since the update algorithm needs to read and write O(log n) memory cells of the authenticated data structure, each cell storing exactly one hash value. The group complexity of a data collection (e.g., proof or ADS group complexity) is defined as the number of elementary data objects (e.g., hash values or elements in $\mathbb{Z}_p$) contained in this collection. Note that although the access and group complexities are respectively related to the time and space complexities, the former are in principle smaller than the latter. This is because time and space complexities are counting number of bits and are always functions of the security parameter which, in turn, is always $\Omega(\log n)$. Therefore time and space complexities are always $\Omega(\log n)$, whereas access and group complexities can be O(1). Finally, whenever it is clear from the context, we omit the terms "access" and "group".

[3] We use the term "access complexity" instead of the "query complexity" used in memory checking [7, 14] to avoid ambiguity when referring to algorithm query of the ADS scheme. We also require that each memory cell can store up to O(poly(log n)) bits, a word size used in [7, 14].

Related work. The great majority of authenticated data structures involve the use of cryptographic hashing [2, 7, 18, 20, 39, 23, 27] or other primitives [17, 31, 32] to hierarchically compute over the outsourced data one or more digests. Most of these schemes incur verification costs that are proportional to the time spent to produce the query answer, thus they are not operation sensitive. Some bandwidth-optimal and

TABLE 1

Asymptotic access and group complexities of various ADS schemes for intersection queries on t = O(1) sets in a collection of m sets with answer size δ.

|  | setup | update, refresh | query | verify, \|π\| | assumption |
|---|---|---|---|---|---|
| [23, 38] | m + M | log n + log m | n + log m | n + log m | Generic CR |
| [26] | m + M | m + M | n | n | Strong RSA |
| [29] | $m^r$ + M | $m^r$ | 1 | δ | Discrete Log |
| this work | m + M | 1 | n $\log^3$ n + $m^\epsilon$ log m | δ | Bilinear q-Strong DH |

Here, M is the sum of sizes of all the sets and $0 < \epsilon < 1$ is a constant.
Also, all sizes of the intersected or updated sets are Θ(n), \|π\| denotes the size of the proof, and
CR stands from "collision resistance".

operation-sensitive solutions for verification of various (e.g., range search) queries appear in [2, 19].

Despite the fact that privacy-related problems for set operations have been extensively studied in the cryptographic literature (e.g., [9, 15]), existing work on the integrity dimension of set operations appears mostly in the database literature. In [23], the importance of coming up with an operation-sensitive scheme is identified. In [26], possibly the closest in context work to ours, set intersection, union and difference are authenticated with linear costs. Similar bounds appear in [38]. In [29], a different approach is taken: In order to achieve operation-sensitivity, expensive pre-processing and exponential space are required (answers to all possible queries are signed). Finally, related to our work are non-membership proofs, both for the RSA [22] and the bilinear-map [3, 13] accumulators. A comparison of our work with existing schemes appears in Table 1.

5 BRIEF DESCRIPTION OF THE DRAWINGS

These and other features, aspects, and advantages of the present invention will become better understood with reference to the following description, appended claims, and accompanying drawings where:

6 DETAILED DESCRIPTION OF THE PREFERRED EMBODIMENTS

6.1 Preliminaries

Figure 1:
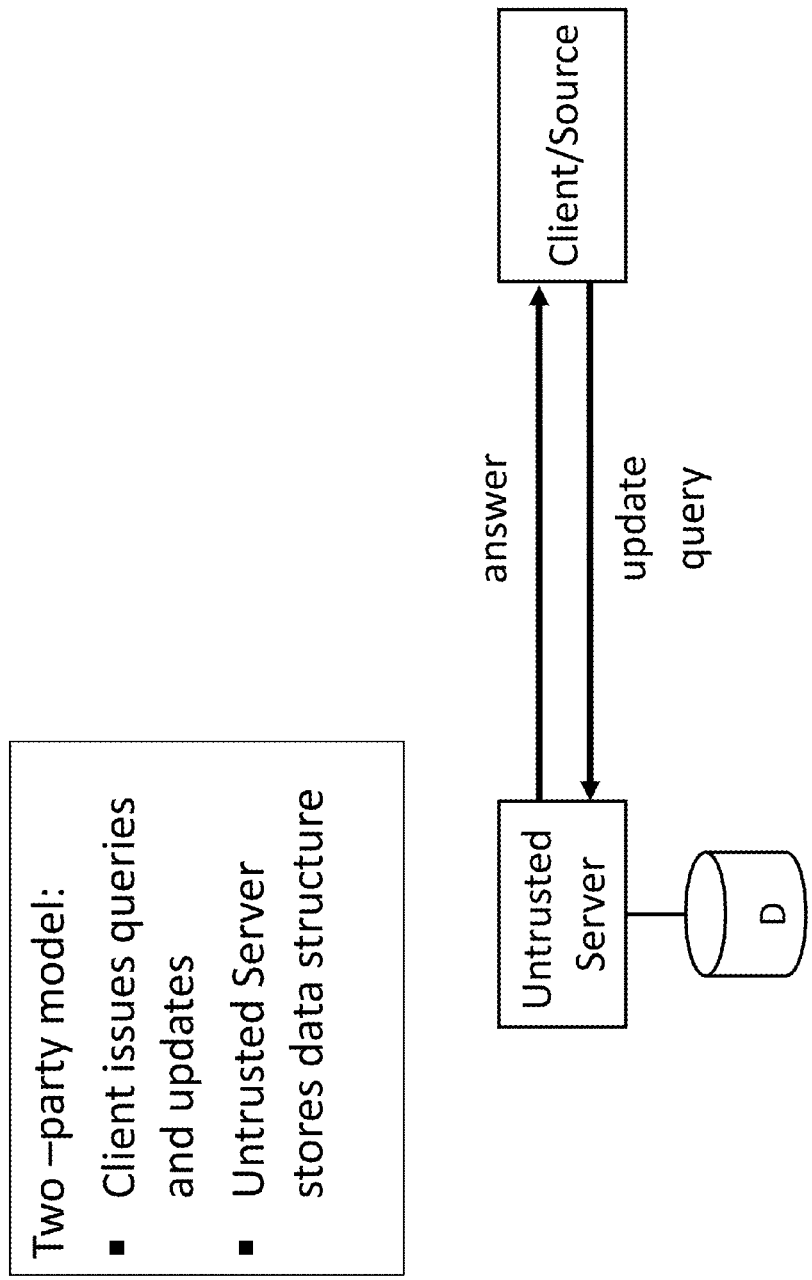
FIG. 1 shows a flow chart of a two-party implementation of the method and system of the present invention where the client is also the trusted source.

We denote with k the security parameter and with $neg(k)$ a negligible function.[4]

[4]Function $f: \mathbb{N} \to \mathbb{R}$ is $neg(k)$ if and only if for any nonzero polynomial $p(k)$ there exits N such that for all $k > N$ it is $f(k) < 1/p(k)$.

The bilinear-map accumulator. Let $\mathbb{G}$ be a cyclic multiplicative group of prime order p, generated by element $g \in \mathbb{G}$. Let also $\mathcal{G}$ be a cyclic multiplicative group of the same order p, such that there exists a pairing $e: \mathbb{G} \times \mathbb{G} \to \mathcal{G}$ with the following properties: (i) Bilinearity: $e(P^a, Q^b) = e(P, Q)^{ab}$ for all $P, Q \in \mathbb{G}$ and $a, b \in \mathbb{Z}_p$; (ii) Non-degeneracy: $e(g,g) \neq 1$; (iii) Computability: For all $P, Q \in \mathbb{G}$, $e(P, Q)$ is efficiently computable. We call $(p, \mathbb{G}, \mathcal{G}, e, g)$ a tuple of bilinear pairing parameters, produced as the output of a probabilistic polynomial-time algorithm that runs on input $1^k$.

In this setting, the bilinear-map accumulator [28] is an efficient way to provide short proofs of membership for elements that belong to a set. Let $s \in \mathbb{Z}_p^*$ be a randomly chosen value that constitutes the trapdoor in the scheme. The accumulator primitive accumulates elements in $\mathbb{Z}_p - \{s\}$, outputting a value that is an element in $\mathbb{G}$. For a set of elements $\chi$ in $\mathbb{Z}_p - \{s\}$ the accumulation value $acc(\chi)$ of $\chi$ is defined as $$acc(\chi) = g^{\prod_{x \in \chi}(x+s)}.[5]$$

[5]$\prod_{x \in S_i}(x+s)$ is called characteristic polynomial of set $S_i$ in the literature (e.g., see [25]).

Value $acc(\chi)$ can be constructed using $\chi$ and $g, g^s, g^{s^2}, \ldots, g^{s^q}$ (through polynomial interpolation), where $q \geq |\chi|$. Subject to $acc(\chi)$ each element in $\chi$ has a succinct membership proof. More generally, the proof of subset containment of a set $S \subset \chi$—for $|S| = 1$, this becomes a membership proof—is the witness $(S, W_{S,\chi})$ where $$W_{S,\chi} = g^{\prod_{x \in \chi - S}(x+s)}. \quad (1)$$

Subset containment of S in $\chi$ can be checked through relation $e(W_{S,\chi}, g^{\prod_{x \in S}(x+s)}) \stackrel{?}{=} e(acc(\chi), g)$ by any verifier with access only to public information. The security property of the bilinear-map accumulator, namely that computing fake but verifiable subset containment proofs is hard, can be proved using the bilinear q-strong Diffie-Hellman assumption, which is slightly stronger than the q-strong Diffie-Hellman assumption [8].[6]

[6]However, the plain q-strong Diffie-Hellman assumption [28] suffices to prove just the collision resistance of the bilinear-map accumulator.

Assumption 1 (Bilinear q-strong Diffie-Hellman assumption) Let k be the security parameter and $(p, \mathbb{G}, \mathcal{G}, e, g)$ be a tuple of bilinear pairing parameters. Given the elements $g, g^s, \ldots, g^{s^q} \in \mathbb{G}$ for some s chosen at random from $\mathbb{Z}_p^*$, where $q = poly(k)$, no probabilistic polynomial-time algorithm can output a pair $(\alpha, e(g,g)^{1/(\alpha+s)}) \in \mathbb{Z}_p \times \mathcal{G}$, except with negligible probability $neg(k)$.

We next prove the security of subset witnesses by generalizing the proof in [28]. Subset witnesses also appeared (independent of our work but without a proof) in [10].

Lemma 1 (Subset containment) Let k be the security parameter and $(p, \mathbb{G}, \mathcal{G}, e, g)$ be a tuple of bilinear pairing parameters. Given the elements $g, g^s, \ldots, g^{s^q} \in \mathbb{G}$ for some s chosen at random from $\mathbb{Z}_p^*$ and a set of elements $\chi$ in $\mathbb{Z}_p - \{s\}$ with $q \geq |\chi|$, suppose there is a probabilistic polynomial-time algorithm that finds S and W such that $S \subset \chi$ and $e(W, g^{\prod_{x \in S}(x+s)}) = e(acc(\chi), g)$. Then there is a probabilistic polynomial-time algorithm that breaks the bilinear q-strong Diffie-Hellman assumption.

Proof: Suppose there is a probabilistic polynomial-time algorithm that computes such a set $S = \{y_1, y_2, \ldots, y_l\}$ and a fake witness W. Let $\chi = \{x_1, x_2, \ldots, x_n\}$ and $y_j \notin \chi$ for some $1 \leq j \leq l$. This means that $$e(W,g)^{\prod_{y \in S}(y+s)} = e(g,g)^{(x_1+s)(x_2+s)\cdots(x_n+s)}.$$

Note that $(y_j + s)$ does not divide $(x_1+s)(x_2+s) \cdots (x_n+s)$. Therefore there exist polynomial Q(s) (computable in polynomial time) of degree n−1 and constant $\lambda \neq 0$, such that $(x_1+s)(x_2+s) \cdots (x_n+s) = Q(s)(y_j+s) + \lambda$. Thus we have $$e(W, g)^{(y_j+s)\prod_{1 \leq i \neq j \leq l}(y_i+s)} = e(g, g)^{Q(s)(y_j+s)+\lambda} \Rightarrow$$

$$e(g, g)^{\frac{1}{y_j+s}} = \left[e(W, g)^{\prod_{1 \leq i \neq j \leq l}(y_i+s)} e(g, g)^{-Q(s)}\right]^{\lambda^{-1}}.$$

Thus, this algorithm can break the bilinear q-strong Diffie-Hellman assumption. □

Tools for polynomial arithmetic. Our solutions use (modulo p) polynomial arithmetic. We next present two results that are extensively used in our techniques, contributing to achieve the desired complexity goals. The first result on polynomial interpolation is derived using an FFT algorithm (see Preparata and Sarwate [34]) that computes the DFT in a finite field (e.g., $\mathbb{Z}_p$) for arbitrary n and performing $O(n \log n)$ field operations. We note that an n-th root of unity is not required to exist in $\mathbb{Z}_p$ for this algorithm to work.

Lemma 2 (Polynomial interpolation with FFT [34]) Let $\Pi_{i=1}^{n}(x_i+s)=\Sigma_{i=0}^{n}b_i s^i$ be a degree-n polynomial. The coefficients $b_n\neq 0, b_{n-1}, \ldots, b_0$ of the polynomial can be computed with O(n log n) complexity; given $x_1, x_2, \ldots, x_n$.

Lemma 2 refers to an efficient process for computing the coefficients of a polynomial, given its roots $x_1, x_2, \ldots, x_n$. In our construction, we make use of this process a numbers of times, in particular, when, given some values $x_1, x_2, \ldots, x_n$ to be accumulated, an untrusted party needs to compute $g^{(x_1+s)(x_2+s)\cdots(x_n+s)}$ without having access to s. However, access to $g, g^s, \ldots, g^{s^n}$ (part of the public key) is allowed, and therefore computing the accumulation value boils down to a polynomial interpolation.

We next present a second result that will be used in our verification algorithms. Related to certifying algorithms [21], this result states that if the vector of coefficients $b=[b_n, b_{n-1}, \ldots, b_0]$ is claimed to be correct, then, given the vector of roots $x=[x_1, x_2, \ldots, x_n]$, with high probability, vector b can be certified to be correct with complexity asymptotically less than O(n log n), i.e., without an FFT computation from scratch. This is achieved with the following algorithm:

Algorithm {accept, reject}←certify(b, x, pk): The algorithm picks a random $\kappa \in Z^*_p$. If $\Sigma_{i=0}^{n}b_i\kappa^i=\Pi_{i=1}^{n}(x_i+\kappa)$, then the algorithm accepts, else it rejects.

Lemma 3 (Polynomial coefficients verification) Let $b=[b_n, b_{n-1}, \ldots, b_0]$ and $x=[x_1, x_2, \ldots, x_n]$. Algorithm certify(b, x, pk) has O(n) complexity. Also, if accept←certify(b, x, pk), then $b_n, b_{n-1}, \ldots, b_0$ are the coefficients of the polynomial $\Pi_{i=1}^{n}(x_i+s)$ with probability $\Omega(1-\text{neg}(k))$.

Authenticated data structure scheme. We now define our authenticated data structure scheme (ADS scheme), as well as the correctness and security properties it must satisfy.

Definition 1 (ADS scheme) Let D be any data structure that supports queries q and updates u. Let auth(D) denote the resulting authenticated data structure and d the digest of the authenticated data structure, i.e., a constant-size description of D. An ADS scheme A is a collection of the following six probabilistic polynomial-time algorithm:

1. {sk, pk}←genkey($1^k$): On input the security parameter k, it outputs a secret key sk and a public key pk;
2. {auth($D_0$), $d_0$}←setup($D_0$, sk, pk): On input a (plain) data structure $D_0$ and the secret and public keys, it computes the authenticated data structure auth($D_0$) and the respective digest $d_0$ of it;
3. {$D_{h+1}$, auth($D_{h+1}$), $d_{h+1}$, upd}←update(u, $D_h$, auth($D_h$), $d_h$, sk, pk): On input an update u on data structure $D_h$, the authenticated data structure auth($D_h$), the digest $d_h$ and the secret and public keys, it outputs the updated data structure $D_{h+1}$ along with the updated authenticated data structure auth($D_{h+1}$), the updated digest $d_{h+1}$ and some relative information upd;
4. {$D_{h+1}$, auth($D_{h+1}$), $d_{h+1}$}←refresh(u, $D_h$, auth($D_h$), $d_h$, upd, pk): On input an update u on data structure $D_h$, the authenticated data structure auth($D_h$), the digest $d_h$, relative information upd (output by update), and the public key, it outputs the updated data structure $D_{h+1}$ along with the updated authenticated data structure auth($D_{h+1}$) and the updated digest $d_{h+1}$;
5. {$\Pi(q)$, $\alpha(q)$}←query(q, $D_h$, auth($D_h$), pk): On input a query q on data structure $D_h$, the authenticated data structure auth($D_h$) and the public key, it returns the answer $\alpha(q)$ to the query, along with a proof $\Pi(q)$;
6. {accept, reject}←verify(q, $\alpha$, $\Pi$, $d_h$, pk): On input a query q, an answer $\alpha$, a proof $\Pi$, a digest $d_h$ and the public key, it outputs either accept or reject.

Let {accept, reject}←check(q, $\alpha$, $D_h$) be an algorithm that decides whether $\alpha$ is a correct answer for query q on data structure $D_h$ (check is not part of the definition of an ADS scheme). There are two properties that an ADS scheme should satisfy, namely correctness and security (intuition follows from signature schemes definitions).

Definition 2 (Correctness) Let ASC be an ADS scheme {genkey, setup, update, refresh, query, verify}. We say that the ADS scheme ASC is correct if, for all k∈N, for all {sk, pk} output by algorithm genkey, for all $D_h$, auth($D_h$), $d_h$ output by one invocation of setup followed by polynomially-many invocations of refresh, where h≥0, for all queries q and for all $\Pi(q)$, $\alpha(q)$ output by query(q, $D_h$, auth($D_h$), pk), with all but negligible probability, whenever algorithm check(q, $\alpha(q)$, $D_h$) outputs accept, so does algorithm verify(q, $\Pi(q)$, $\alpha(q)$, $d_h$, pk).

Definition 3 (Security) Let ASC be an ADS scheme {genkey, setup, update, refresh, query, verify}, k be the security parameter; v(k) be a negligible function and {sk, pk}←genkey($1^k$). Let also Adv be a probabilistic polynomial-time adversary that is only givers pk. The adversary has unlimited access to all algorithms of ASC, except for algorithms setup and update to which he has only oracle access. The adversary picks an initial state of the data structure $D_0$ and computes $D_0$, auth($D_0$), $d_0$ through oracle access to algorithm setup. Then, for i=0, ..., h=poly(k), Adv issues an update $u_i$ in the data structure $D_i$ and computes $D_{i+1}$, auth($D_{i+1}$) and $d_{i+1}$ through oracle access to algorithm update. Finally the adversary picks an index 0≤t≤h+1, and computes a query q, an answer $\alpha$ and a proof $\Pi$. We say that the ADS scheme ASC is secure if for all k∈N, for all {sk, pk} output by algorithm genkey, and for any probabilistic polynomial-time adversary Adv it holds that $$Pe\left[\begin{array}{l}\{q, \Pi, \alpha, t\} \leftarrow Adv(1^k, pk); \quad \text{accept} \leftarrow \text{verify}(q, \alpha, \Pi, d_t, pk); \\ \text{reject} \leftarrow \text{check}(q, \alpha, D_t).\end{array}\right] \leq \quad (2)$$

$$v(k).$$

6.2 Construction and Algorithms

In this section we present an ADS scheme for set-operation verification. The underlying data structure for which we design our ADS scheme is called sets collection, and can be viewed as a generalization of the inverted index [4] data structure.

Sets collection. Referring now to FIGS. 5, 6, 11 and 12, the sets collection data structure consists of m sets, denoted with $S_1, S_2, \ldots, S_m$, each containing elements from a universe U. Without loss of generality we assume that the universe U is the set of nonnegative integers in the interval [m+1, p−1]−{s},[7] where p is k-bit prime, m is the number of the sets in our collection that has bit size O(log k), k is the security parameter and s is the trapdoor of the scheme (see algorithm genkey). A set $S_i$ does not contain duplicate elements, however an element x∈U can appear in more than one set. Each set is sorted and the total space needed is O(m+M), where M is the sum of the sizes of the sets.

[7]This choice simplifies the exposition; however, by using some collision-resistant hash functions, universe U can be set to $Z_p−\{s\}$.

In order to get some intuition, we can view the sets collection as an inverted index. In this view, the elements are pointers to documents and each set $S_i$ corresponds to a term $w_i$ in the dictionary, containing the pointers to documents where term $w_i$ appears. In this case, m is the number of terms being indexed, which is typically in the hundreds of thousands, while M, bounded from below by the number of documents being indexed, is typically in the billions. Thus, the more general terms "elements" and "sets" in a sets collection can be instantiated to the more specific "documents" and "terms".

The operations supported by the sets collection data structure consist of updates and queries. An update is either an insertion of an element into a set or a deletion of an element from a set. An update on a set of size n takes O(log n) time. For simplicity, we assume that the number m of sets does not change after updates. A query is one of the following standard set operations: (i) Intersection: Given indices $i_1, i_2, \ldots, i_t$, return set $I = S_{i_1} \cap S_{i_2} \cap \ldots \cap S_{i_t}$; (ii) Union: Given indices $i_1, i_2, \ldots, i_t$, return set $U = S_{i_1} \cap S_{i_2} \cap \ldots \cap S_{i_t}$; (iii) Subset query: Given indices i and j, return true if $S_i \subset S_j$ and false otherwise; (iv) Set difference: Given indices i and j, return set $D = S_i - S_j$. For the rest of the paper, we denote with $\delta$ the size of the answer to a query operation, i.e., $\delta$ is equal to the size of I, U, or D. For a subset query, $\delta$ is O(1).

We next detail the design of an ADS scheme ASC for the sets collection data structure. This scheme provides protocols for verifying the integrity of the answers to set operations in a dynamic setting where sets evolve over time through updates. The goal is to achieve optimality in the communication and verification complexity: a query with t parameters and answer size $\delta$ should be verified with O(t+$\delta$) complexity, and at the same time query and update algorithms should be efficient as well.

6.2.1 Setup and Updates

Referring to FIGS. 7-9, 14 and 15, we describe an ADS scheme ASC={genkey, setup, update, refresh, query, verify} for the sets collection data structure and we prove that its algorithms satisfy the complexities of Table 1. We begin with the algorithms that are related to the setup and the updates of the authenticated data structure.

Algorithm {sk, pk}←genkey($^k$): Bilinear pairing parameters (p, $\mathbb{G}$, $\mathcal{G}$, e, g) are picked and an element $s \in \mathbb{Z}_p^*$ is chosen at random. Subsequently, an one-to-one function h($\bullet$): $\mathbb{G} \to \mathbb{Z}_p^*$ is used. This function simply outputs the bit description of the elements of $\mathbb{G}$ according to some canonical representation of $\mathbb{G}$. Finally the algorithm outputs sk=s and pk={h($\bullet$), p, $\mathbb{G}$, $\mathcal{G}$, e, g, g}, where vector g contains values $$\mathbf{g} = [g^s, g^{s^2}, \ldots, g^{s^q}],$$

where $q \geq \max\{m, \max_{i=1,\ldots,m}\{|S_i|\}\}$. The algorithm has O(1) access complexity.

Algorithm {$D_0$, auth($D_0$), $d_0$}←setup($D_0$, sk, pk): Let $D_0$ be our initial data structure, i.e., the one representing sets $S_1, S_2, \ldots, S_m$. The authenticated data structure auth($D_0$) is built as follows. First, for each set $S_i$ its accumulation value acc($S_i$)=$g^{\prod_{x \in S_i}(x+s)}$ is computed (see Section 6.1). Subsequently, the algorithm picks a constant $0 < \epsilon < 1$. Let T be a tree that has $l=\lceil 1/\epsilon \rceil$ levels and m leaves, numbered 1, 2, . . . , m, where m is the number of the sets of our sets collection data structure. Since T is a constant-height tree, the degree of any internal node of it is $O(m^\epsilon)$. We call such a tree an accumulation tree, which was originally introduced (combined with different cryptography) in [32]. For each node of the tree v, the algorithm recursively computes the digest d(v) of v as follows. If v is a leaf corresponding to set $S_i$, where $1 \leq i \leq m$, the algorithm sets d(v)=acc($S_i$)$^{(i+s)}$; here, raising value acc($S_i$) to exponent i+s, under the constraint that i≤m, is done to also accumulate the index i of set $S_i$ (and thus prove that acc($S_i$) refers to $S_i$). If node v is not a leaf, then $$d(v) = g^{\prod_{w \in N(v)}(h(d(w))+s)},$$

where N(v) denotes the set of children of node v. The algorithm outputs all the sets $S_i$ as the data structure $D_0$, and all the accumulation values acc($S_i$) for $1 \leq i \leq m$, the tree T and all the digests d(v) for all $v \in T$ as the authenticated data structure auth($D_0$). Finally, the algorithm sets $d_0$=d(r) where r is the root of T, i.e., $d_0$ is the digest of the authenticated data structure (defined similarly as in a Merkle tree).[8] The access complexity of the algorithm is O(m+M) (for postorder traversal of T and computation of acc($S_i$)), where $m = \sum_{i=1}^m |S_i|$. The group complexity of auth($D_0$) is also O(m+M) since the algorithm stores one digest per node of T, T has O(m) nodes and there are M elements contained in the sets, as part of auth($D_0$).

[8]Digest d(r) is a "secure" succinct description of the set collection data structure. Namely, the accumulation tree protects the integrity of values acc($S_i$), $1 \leq i \leq m$, and each accumulation value acc($S_i$) protects the integrity of the elements contained in set $S_i$.

Algorithm {$D_{h+1}$, auth($D_{h+1}$), $d_{h+1}$, upd}←update(u, $D_h$, auth($D_h$), $d_h$, sk, pk): We consider the update "insert element $x \in U$ into set $S_i$" (note that the same algorithm could be used for element deletions). Let $v_0$ be the leaf node of T corresponding to set $S_i$. Let $v_0, v_1, \ldots, v_l$ be the path in T from node $v_0$ to the root of the tree, where $l = \lceil 1/\epsilon \rceil$. The algorithm initially sets d($v_0$)=acc($S_i$)$^{(x+s)}$, i.e., it updates the accumulation value that corresponds to the updated set (note that in the case where x is deleted from $S_i$, the algorithm sets d'($v_0$)=acc($S_i$)$^{(x+s)^{-1}}$). Then the algorithm sets $$d'(v_j) = d(v_j)^{(h(d'(v_{j-1}))+s)(h(d(v_{j-1}))+s)^{-1}} \text{ for } j=1,\ldots,l, \quad (4)$$

where d($v_{j-1}$) is the current digest of $v_{j-1}$ and d'($v_{j-1}$) is the updated digest of $v_{j-1}$.[9] All these newly computed values (i.e., the new digests) are stored by the algorithm. The algorithm then outputs the new

[9]Note that these update computations are efficient because update has access to secret key s. digests d'($v_{j-1}$), j=1, . . . , l, along the path from the updated set to the root of the tree, as part of information upd. Information upd also includes x and d($v_l$). The algorithm also sets $d_{h+1}$=d'($v_l$), i.e., the updated digest is the newly computed digest of the root of T. Finally the new authenticated data structure auth($D_{h+1}$) is computed as follows: in the current authenticated data structure auth($D_h$) that is input of the algorithm, the values d($v_{j-1}$) are overwritten with the new values d'($v_{j-1}$)(j≤1, . . . , l), and the resulting structure is included in the output of the algorithm. The number of operations performed is proportional to $1/\epsilon$, therefore the complexity of the algorithm is O(1).

Algorithm {$D_{+1}$, auth($D_{h+1}$), $d_{h+1}$}←refresh(u, $D_h$, auth($D_h$), $d_h$, upd, pk): We consider the update "insert element $x \in U$ into set $S_i$". Let $v_0$ be the node of T corresponding to set $S_i$. Let $v_0, v_1, \ldots, v_l$ be the path in T from node $v_0$ to the root of the tree. Using the information upd, the algorithm sets d($v_j$)=d'($v_j$) for j=0, . . . , l, i.e., it updates the digests that correspond to the updated path. Finally, it outputs the updated sets collection as $D_{h+1}$, the updated digests d($v_j$) (along with the ones that belong to the nodes that are not updated) as auth($D_{h+1}$) and d'($v_l$) (contained in upd) as $d_{h+1}$.[10] The algorithm has O(1) complexity as the number of performed operations is O($1/\epsilon$).

[10]Note that information upd is not required for the execution of refresh, but is rather used for efficiency. Without access to upd, algorithm refresh could compute the updated values d($v_j$) using polynomial interpolation, which would have O($m^\epsilon$ log m) complexity (see Lemma 2).

6.2.2 Authenticity of Accumulation Values

Figure 15:
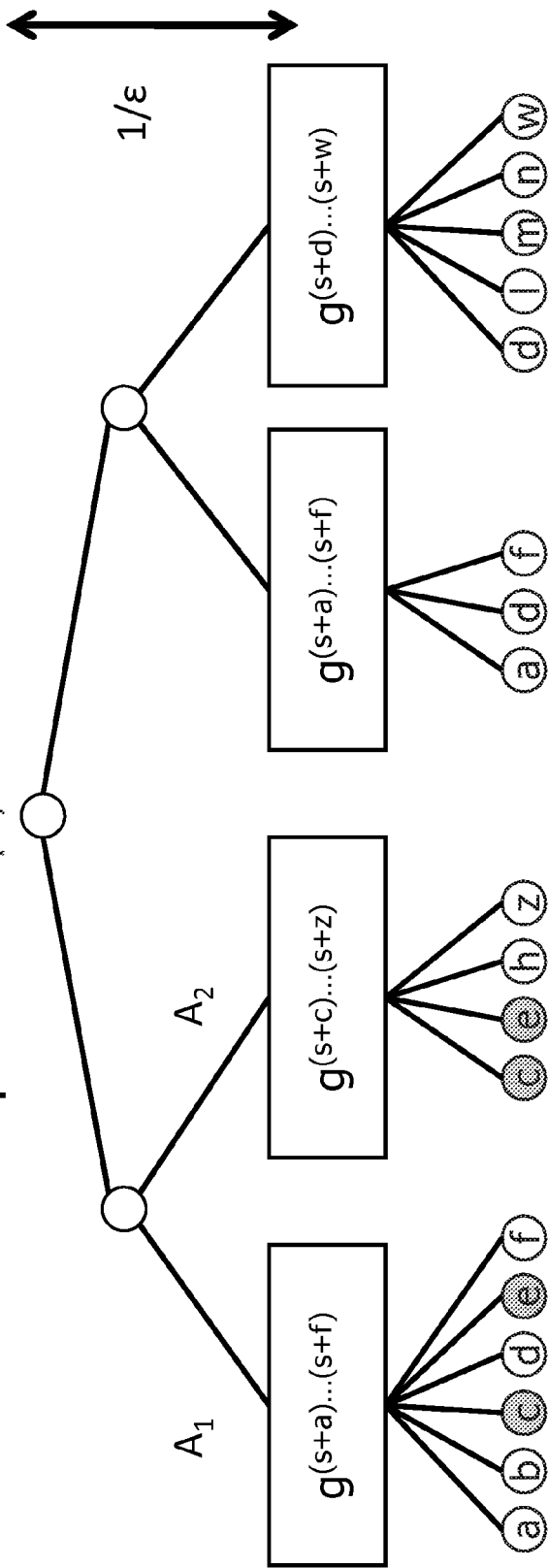
FIG. 15 shows a third step in the proof of finding the answer in the digest.

Referring to FIG. 15, so far we have described the authenticated data structure auth($D_h$) that our ADS scheme ASC will use for set-operation verifications. Overall, auth($D_h$) comprises a set of m accumulation values acc($S_i$), one for each set $S_i$, i=1, . . . , m, and a set of O(m) digests d(v), one for each internal node v of the accumulation tree T. Our proof construction and verification protocols for set operations (described in Section 6.2.3) make use of the accumulation values acc($S_i$) (subject to which subset-containment witnesses can be defined), and therefore it is required that the authenticity of each such value can be verified. Tree T serves this exact role by providing short correctness proofs for each value acc($S_i$) stored at leaf i of T, this time subject to the (global) digest $d_h$ stored at the root of T. We next provide the details related to proving the authenticity of acc($S_i$).

The correctness proof $\Pi_i$ of accumulation value $acc(S_i)$, $1 \le i \le m$, is a collection of $O(1)$ bilinear-map accumulator witnesses (as defined in Section 6.1). In particular, $\Pi_i$ is set to be the ordered sequence $\Pi = (\pi_1, \pi_2, \ldots, \pi_l)$, where $\pi_j$ is the pair of the digest of node $v_{j-1}$ and a witness that authenticates $v_{j-1}$, subject to node $v_j$, in the path $v_0, v_1, \ldots, v_l$ defined by leaf $v_0$ storing accumulation value $acc(S_i)$ and the root $v_l$ of T. Conveniently, $\pi_j$ is defined as $\pi_j = (\beta_j, \gamma_j)$, where $$\beta_j = d(v_{j-1}) \text{ and } \gamma_j = W_{v_{j-1}(v_j)} = g^{\prod w \in \mathcal{N}(v_j) - \{v_{j-1}\}(h(d(w))+s)}. \quad (5)$$

Note that $\pi'$ is the witness for a subset of one element, namely $h(d(v_{j-1}))$ (recall, $d(v_0) = acc(S_i)^{(i+s)}$). Clearly, pair $\pi_j$ has group complexity $O(1)$ and can be constructed using polynomial interpolation with $O(m^\epsilon \log m)$ complexity, by Lemma 2 and since $v_j$ has degree $O(m^\epsilon)$. Since $\Pi_i$ consists of $O(1)$ such pairs, we conclude that the proof $\Pi_i$ for an accumulation value $acc(S_i)$ can be constructed with $O(m^\epsilon \log m)$ complexity and has $O(1)$ group complexity. The following algorithms queryTree and verifyTree are used to formally describe the construction and respectively the verification of such correctness proofs. Similar methods have been described in [32].

Algorithm $\{\Pi_i, \alpha_i\} \leftarrow$ queryTree$(i, D_h, \text{auth}(D_h), \text{pk})$: Let $v_0, v_1, \ldots, v_l$ be the path of T from the node storing $acc(S_i)$ to the root of T. The algorithm computes $\Pi_i$ by setting $\Pi_i = (\pi_1, \pi_2, \ldots, \pi_l)$, where $\pi_j = (d(v_{j-1}), W_{v_{j-1}(v_j)} \text{ and } W_{v_{j-1}}^{(v)})$ is given in Equation 5 and computed by Lemma 2. Finally, the algorithm sets $\alpha_i = acc(S_i)$.

Algorithm $\{\text{accept, reject}\} \leftarrow$ verifyTree$(i, \alpha_i, \Pi_i, d_h, \text{pk})$: Let the proof be $\Pi_i = (\pi_1, \pi_2, \ldots, \pi_l)$, where $\pi_j = (\beta_j, \gamma_j)$. The algorithm outputs reject if one of the following is true: (i) $e(\beta_1, g) \ne e(\alpha_i, g^i g^s)$; or (ii) $e(\beta_j, g) \ne e(\gamma_{j-1}, g^{h(\beta_{j-1})} g^s)$ for some $2 \le j \le l$; or (iii) $e(d_h, g) \ne e(\gamma_l, g^{h(\beta_l)} g^s)$. Otherwise, it outputs accept.

We finally provide some complexity and security properties that hold for the correctness proofs of the accumulated values. The following result is used as a building block to derive the complexity of our scheme and prove its security (Theorem 1).

Lemma 4 Algorithm queryTree runs with $O(m^\epsilon \log m)$ access complexity and outputs a proof of $O(1)$ group complexity. Moreover algorithm verifyTree has $O(1)$ access complexity. Finally, for any adversarially chosen proof $\Pi_i$ ($1 \le i \le m$), if accept$\leftarrow$verifyTree$(i, \alpha_i, \Pi_i, d_h, \text{pk})$, then $\alpha_i$=acc$(S_i)$ with probability $\Omega(1 - \text{neg}(k))$.

6.2.3 Queries and Verification

Figure 16:
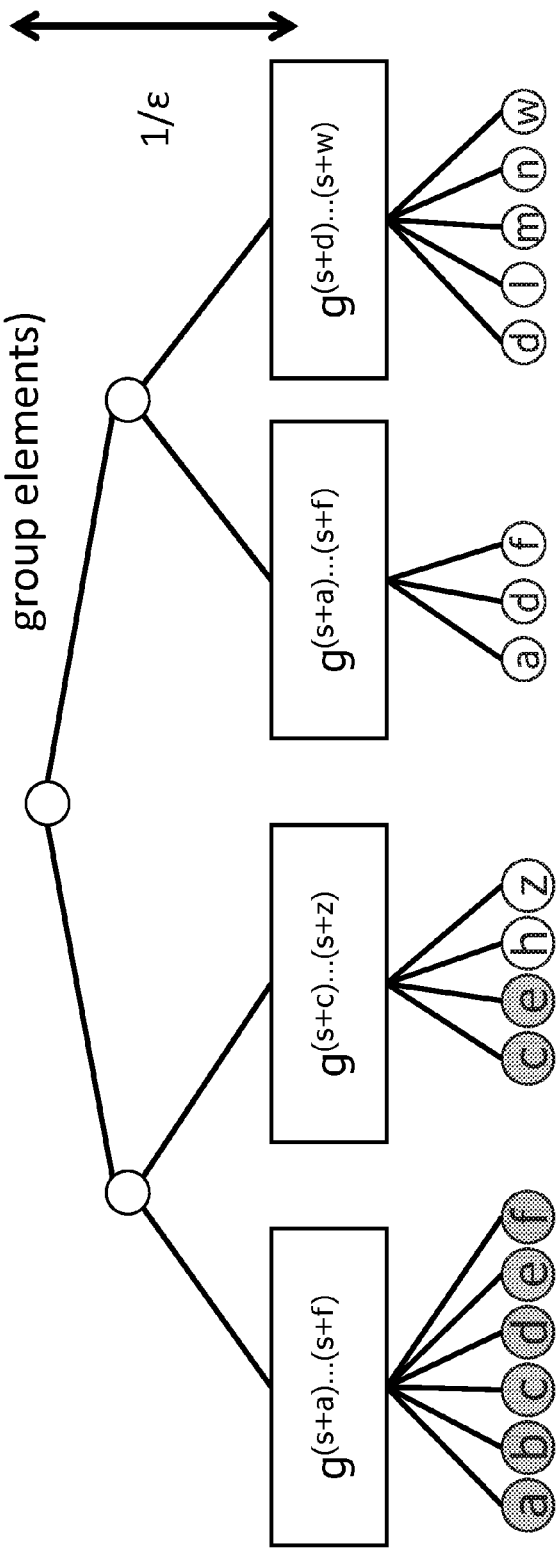
FIG. 16 shows a fourth step in the proof of finding the answer in the digest.
Figure 17:
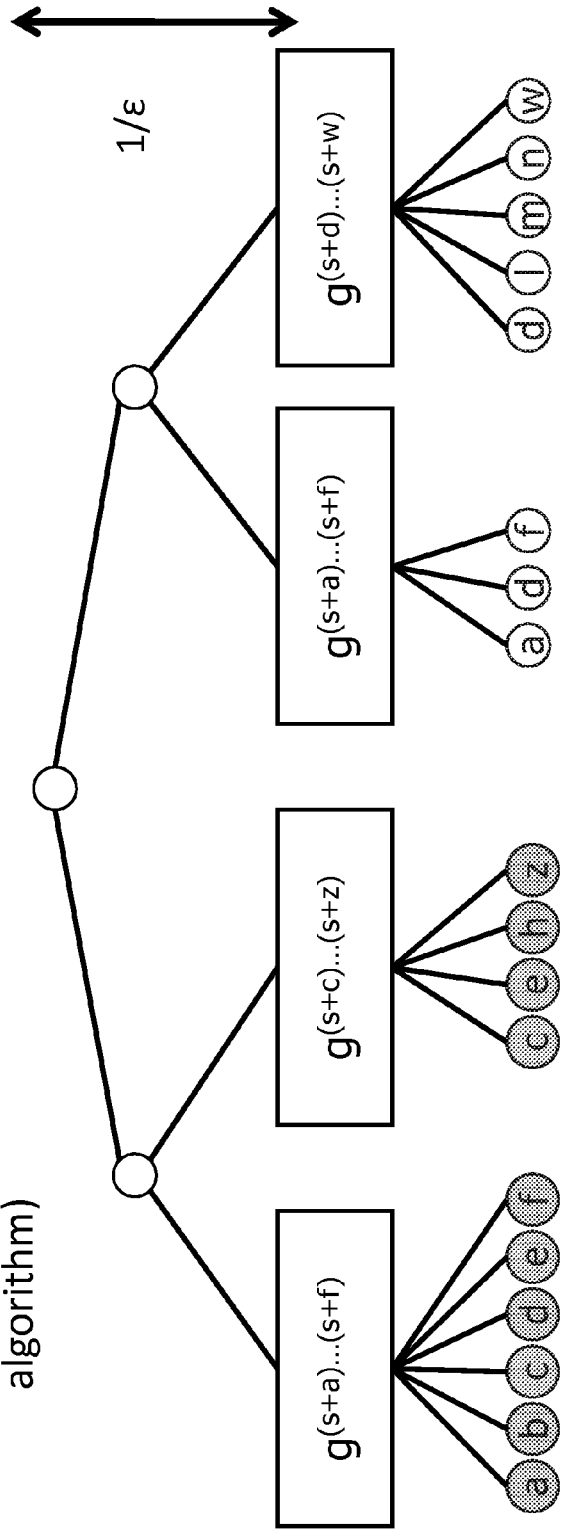
FIG. 17 shows a fifth step in the proof of finding the answer in the digest.

Referring to FIGS. 16 and 17, with the correctness proofs of accumulation values at hand, we complete the description of our scheme ASC by presenting the algorithms that are related to the construction and verification of proofs attesting the correctness of set operations. These proofs are efficiently constructed using the authenticated data structure presented earlier, and they have optimal size $O(t+\delta)$, where $t$ and $\delta$ are the sizes of the query parameters and the answer. in the rest of the section, we focus on the detailed description of the algorithms for an intersection and a union query, but due to space limitations, we omit the details of the subset and the set difference query. We note, however, that the treatment of the subset and set difference queries is analogous to that of the intersection and union queries.

The parameters of an intersection or a union query are $t$ indices $i_1, i_2, \ldots, i_t$, with $1 \le t \le m$. To simplify the notation, we assume without loss of generality that these indices are $1, 2, \ldots, t$. Let $n_i$ denote the size of set $S_i$ ($1 \le i \le t$) and let $N = \Sigma_{i=1}^t n_i$. Note that the size $\delta$ of the intersection or union is always $O(N)$ and that operations can be performed with $O(N)$ complexity, by using a generalized merge.

Intersection query. Let $I = S_1 \cap S_2 \cap \ldots \cap S_t = \{y_1, y_2, \ldots, y_\delta\}$. We express the correctness of the set intersection operation by means of the following two conditions:

Subset condition:

$$I \subseteq S_1 \wedge I \subseteq S_2 \wedge \ldots \wedge I \subseteq S_t; \quad (6)$$

Completeness condition:

$$(S_1 - I) \cap (S_2 - I) \cap \ldots \cap (S_t - I) = \emptyset. \quad (7)$$

The completeness condition in Equation 7 is necessary since I must contain all the common elements. Given an intersection I, and for every set $S_j$, $1 \le i \le t$, we define the degree-$n_j$ polynomial $$P_j(s) = \prod_{x \in S_j - I} (x + s). \quad (8)$$

The following result is based on the extended Euclidean algorithm over polynomials and provides our core verification test for checking the correctness of set intersection.

Lemma 5 Set I is the intersection of sets $S_1, S_2, \ldots, S_t$ if and only if there exist polynomials $q_1(s), q_2(s), \ldots, q_t(s)$ such that $q_1(s) P_1(s) + q_2(s) P_2(s) + \ldots + q_t(s) P_t(s) = 1$, where $P_j(s)$, $j = 1, \ldots, t$, are defined in Equation 8. Moreover, the polynomials $q_1(s), q_2(s), \ldots, q_t(s)$ can be computed with $O(N \log^2 N \log \log N)$ complexity.

Using Lemmas 2 and 5 we next construct efficient proofs for both conditions in Equations 6 and 7. In turn, the proofs are directly used to define the algorithms query and verify of our ADS scheme ASC for intersection queries.

Proof of subset condition. For each set $S_j$, $1 \le j \le t$, the subset witnesses $W_{I,j} = g^{P_j(s)} = g^{\prod x \in S_j - I (x+s)}$ are computed, each with $O(n_j \log n_j)$ complexity, by Lemma 2. (Recall, $W_{I,j}$ serves as a proof that I is a subset of set $S_j$.) Thus, the total complexity for computing all $t$ required subset witnesses is $O(N \log N)$, where $N = \Sigma_{i=1}^t n_i$.[11]

[11]This is because $\Sigma n_j \log n_j \le \log N \Sigma n_j = N \log N$.

Proof of completeness condition. For each $q_j(s)$, $1 \le j \le t$, as in Lemma 5 satisfying $q_1(s) P_1(s) + q_2(s) P_2(s) + \ldots + q_t(s) P_t(s) = 1$, the completeness witnesses $F_{I,j} = g^{q_j(s)}$ are computed, by Lemma 5 with $O(N \log^2 N \log \log N)$ complexity.

Algorithm $\{\Pi(q), \alpha(q)\} \leftarrow$ query$(q, D_h, \text{auth}(D_h), \text{pk})$ (Intersection): Query $q$ consists of $t$ indices $\{1, 2, \ldots, t\}$, asking for the intersection I of $S_1, S_2, \ldots, S_t$. Let $I = \{y_1, y_2, \ldots, y_\delta\}$. Then $\alpha(q) = I$, and the proof $\Pi(q)$ consists of the following parts.

1. Coefficients $b_\delta, b_{\delta-1}, \ldots, b_0$ of polynomial $(y_1 + s)(y_2 + s) \ldots (y_\delta + s)$ that is associated with the intersection $I = \{y_1, y_2, \ldots, y_\delta\}$. These are computed with $O(\delta \log \delta)$ complexity (Lemma 2) and they have $O(\delta)$ group complexity.
2. Accumulation values $acc(S_j)$, $j = 1, \ldots, t$, which are associated with sets $S_j$, along with their respective correctness proofs $\Pi_j$. These are computed by calling algorithm queryTree$(j, D_h, \text{auth}(D_h), \text{pk})$, for $j = 1, \ldots, t$, with $O(tm^\epsilon \log m)$ total complexity and they have $O(t)$ total group complexity (Lemma 4).
3. Subset witnesses $W_{I,j}$, $j = 1, \ldots, t$, which are associated with sets $S_j$ and intersection I (see proof of subset condition). These are computed with $O(N \log N)$ complexity and have $O(t)$ total group complexity (Lemma 2).
4. Completeness witnesses $F_{I,j}$, $j = 1, \ldots, t$, which are associated with polynomials $q_j(s)$ of Lemma 5 (see proof of completeness condition). These are computed with $O(N \log^2 N \log \log N)$ complexity and have $O(t)$ group complexity (Lemma 5).

Algorithm $\{accept, reject\} \leftarrow verify(q, \alpha, \Pi, d_h, pk)$ (Intersection): Verifying the result of an intersection query includes the following steps.

1. First, the algorithm uses the coefficients $b=[b_\delta, b_{\delta-1}, \ldots, b_0]$ and the answer $\alpha(q)=\{y_1, y_2, \ldots, y_\delta\}$ as an input to algorithm $certify(b, \alpha(q), pk)$, in order to certify the validity of $b_\delta, b_{\delta-1}, \ldots, b_0$. If certify outputs reject, the algorithm also outputs reject.[12] This step has $O(\delta)$ complexity (Lemma 3).

[12] Algorithm certify is used to achieve optimal verification and avoid an $O(\delta \log \delta)$ FFT computation from scratch.

2. Subsequently, the algorithm uses the proof $\Pi_j$ to verify the correctness of $acc(S_j)$, by running algorithm verifyTree(j, $acc(S_j), \Pi_j, d_h, pk$) for $j=1, \ldots, t$. If, for some j, verifyTree running on $acc(S_j)$ outputs reject, the algorithm also outputs reject. This step has $O(t)$ complexity (Lemma 4).

3. Next, the algorithm checks the subset condition:[13]

$$e\left(\prod_{i=0}^{\delta} (g^{s^i})^{b_i}, W_{1,j}\right) \stackrel{?}{=} e(acc(S_j), g), \text{ for } j = 1, \ldots, t. \quad (9)$$

[13]Group element $$\prod_{i=0}^{\delta} g^{s^i b_i} = g^{(y_1+s)(y_2+s) \ldots (y_\delta+s)}$$

is computed once with $O(\delta)$ complexity.

If, for some j, the above check on subset witness $W_{I,j}$ fails, the algorithm outputs reject. This step has $O(t+\delta)$ complexity.

4. Finally, the algorithm checks the completeness condition:

$$\prod_{j=1}^{t} e(W_{1,j}, F_{1,j}) \stackrel{?}{=} e(g, g). \quad (10)$$

If the above check on the completeness witnesses $F_{I,j}, 1 \le j \le t$, fails, the algorithm outputs reject. Or, if this relation holds, the algorithm outputs accept, i.e., it accepts $\alpha(q)$ as the correct intersection. This step has $O(t)$ complexity.

Note that for Equation 10, it holds $\prod_{j=1}^{t} e(W_{I,j}, F_{I,j}) = e(g,g)^{\sum_{j=1}^{t} q_j(s) P_j(s)} = e(g,g)$ when all the subset witnesses $W_{I,j}$, all the completeness witnesses $F_{I,j}$ and all the sets accumulation values $acc(S_j)$ have been computed honestly, since $q_1(s) P_1(s) + q_2(s) P_2(s) + \ldots + q_t(s) P_t(s) = 1$. This is a required condition for proving the correctness of our ADS scheme, as defined in Definition 2. We continue with the description of algorithms query and verify for the union query.

Union query. Let $U = S_1 \cap S_2 \cap \ldots \cap S_t = \{y_1, y_2, \ldots, y_\delta\}$. We express the correctness of the set union operation by means of the following two conditions:

Membership condition:

$$\forall y_i \in U \exists j \in \{1, 2, \ldots, t\}: y_i \in S_j; \quad (11)$$

Superset condition:

$$(U \supseteq S_1) \wedge (U \supseteq S_2) \wedge \ldots \wedge (U \supseteq S_t). \quad (12)$$

The superset condition in Equation 12 is necessary since set U must exclude none of the elements in sets $S_1, S_2, \ldots, S_t$. We formally describe algorithms query and verify of our ADS scheme ASC for union queries.

Algorithm $\{\Pi(q), \alpha(q)\} \leftarrow query(q, D_h, auth(D_h), pk)$ (Union): Query q asks for the union U of t sets $S_1, S_2, \ldots, S_t$. Let $U = \{y_1, y_2, \ldots, y_\delta\}$. Then $\alpha(q) = U$ and the proof $\Pi(q)$ consists of the following parts. (1) coefficients $b_\delta, b_{\delta-1}, \ldots, b_0$ of polynomial $(y_1+s)(y_2+s) \ldots (y_\delta+s)$ that is associated with the union $U = \{y_1, y_2, \ldots, y_\delta\}$. (2) Accumulation values $acc(S_j), j=1, \ldots, t$, which are associated with sets $S_j$, along with their respective correctness proofs $\Pi_j$, both output of algo queryTree(j, $D_h, auth(D_h), pk$). (3) Membership witnesses $W_{y_i, S_k}$ of $y_i, i=1, \ldots, \delta$ (see Equation 1), which prove that $y_i$ belongs to some set $S_k, 1 \le k \le t$, and which are computed with $O(N \log N)$ total complexity and have $O(\delta)$ total group complexity (Lemma 2). (4) Subset witnesses $W_{S_j, U}, j=1, \ldots, t$, which are associated with sets $S_j$ and union U and prove that U is a superset of $S_j, 1 \le k \le t$, and which are computed with $O(N \log N)$ total complexity and have $O(t)$ total group complexity (Lemma 2).

Algorithm $\{accept, reject\} \leftarrow verify(q, \alpha, \Pi, d_h, pk)$: (Union): Verifying the result of a union query includes the following steps. (1) First, the algorithm uses $b=[b_\delta, b_{\delta-1}, \ldots, b_0]$ and the answer $U=\alpha(q)=\{y_1, y_2, \ldots, y_\delta\}$ as an input to algorithm $certify(b, \alpha(q), pk)$, in order to certify the validity of $b_\delta, b_{\delta-1}, \ldots, b_0$. (2) Subsequently, the algorithm uses the proofs $\Pi_j$ to verify the correctness of $acc(S_j)$, by using algorithm verifyTree(j, $acc(S_j), \Pi_j, d_h, pk$) for $j=1, \ldots, t$. If the verification fails for at least one of $acc(S_j)$, the algorithm outputs reject. (3) Next, the algorithm algorithm verifies that each element $y_i, i=1, \ldots, \delta$, of the reported union belongs to some set $S_k$, for some $1 \le k \le t$ ($O(\delta)$ complexity). This is done by checking that relation $e(W_{y_i, S_k}, g^{y_i} g^s) = e(acc(S_k), g)$ holds for all $i=1, \ldots, \delta$; otherwise the algorithm outputs reject. (4) Finally, the algorithm verifies that all sets specified by the query are subsets of the union, by checking the following conditions:

$$e(W_{S_j, U}, acc(S_j)) \stackrel{?}{=} e\left(\prod_{i=0}^{\delta} (g^{s^i})^{b_i}, g\right), \text{ for } j = 1, \ldots, t.$$

If any of the above checks fails, the algorithm outputs reject, otherwise, it outputs accept, i.e., U is accepted as the correct union.

Subset and set difference query. For a subset query (positive or negative), we use the property $S_i \subseteq S_j \Leftrightarrow \forall y \in S_i, y \in S_j$. For a set difference query we use the property $$D = S_i - S_j \Leftrightarrow \exists F : F \cup D = S_i \wedge F = S_i \cap S_j.$$

The above conditions can both be checked in an operation-sensitive manner using the techniques we have presented before. We now give the main result in our work.

Theorem 1 Consider a collection of sets $S_1, \ldots, S_m$ and let $M = \sum_{i=1}^{m} |S_i|$ and $0 < \epsilon < 1$. For a query operation involving t sets, let N be the sum of the sizes of the involved sets, and $\delta$ be the answer size. Then there exists an ADS scheme ASC = \{genkey, setup, update, refresh, query, verify\} for a sets collection data structure D with the following properties: (1) ASC is correct and secure according to Definitions 2 and 3 and based on the bilinear q-strong Diffie-Hellman assumption; (2) The access complexity of algorithm (i) genkey is $O(1)$; (ii) setup is $O(m+M)$; (iii) update is $O(1)$ outputting information upd of $O(1)$ group complexity; (iv) refresh is $O(1)$; (3) For all queries q (intersection/union/subset/difference), constructing the proof with algorithm query has O(N log² N log log N+tmᵉ log m) access complexity, algorithm verify has O(t+δ) access complexity and the proof Π(q) has O(t+δ) group complexity; (4) The group complexity of the authenticated data structure auth(D) is O(m+M).

6.3 Security, Protocols and Applications

In this section we give an overview of the security analysis of our ADS scheme, describe how it can be employed to provide verification protocols in the three-party [36] (FIG. 2) and two-party [30] authentication models (FIG. 1), and finally discuss some concrete applications.

Security proof sketch. We provide some key elements of the security of our verification protocols focusing on set intersection queries. The security proofs of the other set operations share similar ideas. Let $D_0$ be a sets collection data structure consisting of m sets $S_1, S_2, \ldots, S_m$,[14] and consider our ADS scheme ASC={genkey, setup, update, refresh, query, verify}. Let k be the security parameter and let $\{sk, pk\} \leftarrow$ genkey($1^k$). The adversary is given the public key pk, namely $\{h(\bullet), p, G, \mathcal{G}, e, g, g^s, \ldots, g^{s^q}\}$, and unlimited access to all the algorithms of ASC, except for setup and update to which he only has oracle access. The adversary initially outputs the authenticated data structure auth($D_0$) and the digest $d_0$, through an oracle call to algorithm setup. Then the adversary picks a polynomial number of updates $u_i$ (e.g., insertion of an element x into a set $S_r$) and outputs the data structure $D_t$, the authenticated data structure auth($D_t$) and the digest $d_t$ through oracle access to update. Then he picks a set of indices q={1, 2, . . . , t} (w log), all between 1 and m and outputs a proof Π(q) and an answer $\mathcal{I} \neq I = S_1 \cap S_2 \cap \ldots \cap S_t$ which is rejected by check as incorrect. Suppose the answer α(q) contains d elements. The proof Π(q) contains (i) Some coefficients $b_0, b_1, \ldots, b_d$; (ii) Some accumulation values $acc_j$ with some respective correctness proofs $\Pi_j$, for j=1, . . . , t; (iii) Some subset witnesses $W_j$ with some completeness witnesses $F_j$, for j=1, . . . , t (this is, what algorithm verify expects for input).

[14] Note here that since the sets are picked by the adversary, we have to make sure that no element in any set is equal to s, the trapdoor of the scheme (see definition of the bilinear-map accumulator domain). However, this event occurs with negligible probability since the sizes of the sets are polynomially-bounded and s is chosen at random from a domain of exponential size.

Suppose verify accepts. Then: (i) By Lemma 3, $b_0, b_1, \ldots, b_d$ are indeed the coefficients of the polynomial $\Pi_{x \in \mathcal{I}}(x+s)$, except with negligible probability; (ii) By Lemma 4, values $acc_j$ are indeed the accumulation values of sets $S_j$, except with negligible probability; (iii) By Lemma 1, values $W_j$ are indeed the subset witnesses for set $\mathcal{I}$ (with reference to $S_j$), i.e., $W_j = g^{P_j(s)}$, except with negligible probability; (iv) However, $P_1(s), P_2(s), \ldots, P_t(s)$ are not coprime since $\mathcal{I}$ is incorrect and therefore $\mathcal{I}$ cannot contain all the elements of the intersection. Thus the polynomials $P_1(s), P_2(s), \ldots, P_t(s)$ (Equation 8) have at least one common factor, say (r+s) and it holds that $P_j(s) = (r+s)Q_j(s)$ for some polynomials $Q_j(s)$ (computable in polynomial time), for all j=1, . . . , t. By the verification of Equation 10 (completeness condition), we have $$e(g, g) = \prod_{j=1}^{t} e(W_j, F_j)$$

$$= \prod_{j=1}^{t} e(g^{P_j(s)}, F_j)$$

$$= \prod_{j=1}^{t} e(g^{(r+s)Q_j(s)}, F_j)$$

$$= \prod_{j=1}^{t} e(g^{Q_j(s)}, F_j)^{(r+s)}$$

$$= \left(\prod_{j=1}^{t} e(g^{Q_j(s)}, F_j)\right)^{(r+s)}.$$

Therefore we can derive an (r+s)-th root of e(g, g) as $$e(g, g)^{\frac{1}{r+s}} = \prod_{j=1}^{t} e(g^{Q_j(s)}, F_j).$$

This means that if the intersection $\mathcal{I}$ is incorrect and all the verification tests are satisfied, we can derive a polynomial-time algorithm that outputs a bilinear q-strong Diffie-Hellman challenge (r, $e(g, g)^{1/(r+s)}$) for an element r that is a common factor of the polynomials $P_1(s), P_2(s), \ldots, P_t(s)$, which by Assumption 1 happens with probability neg(k). This concludes an online of the proof strategy for the case of intersection.

Figure 6:
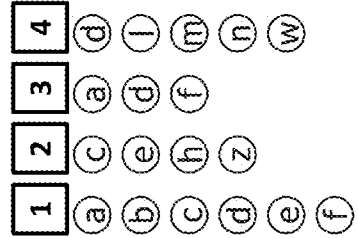
FIG. 6 shows a step where the trusted source authenticates the sets collections and create a digest and signature.
Figure 7:
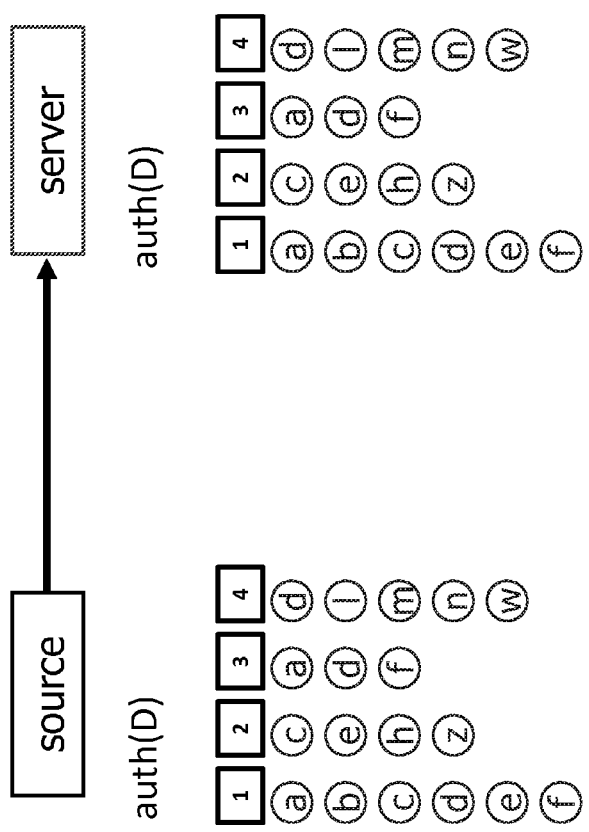
FIG. 7 shows a step where the trusted source performs setup and updates the authenticated sets collection, digest and signature on an untrusted server.
Figure 8:
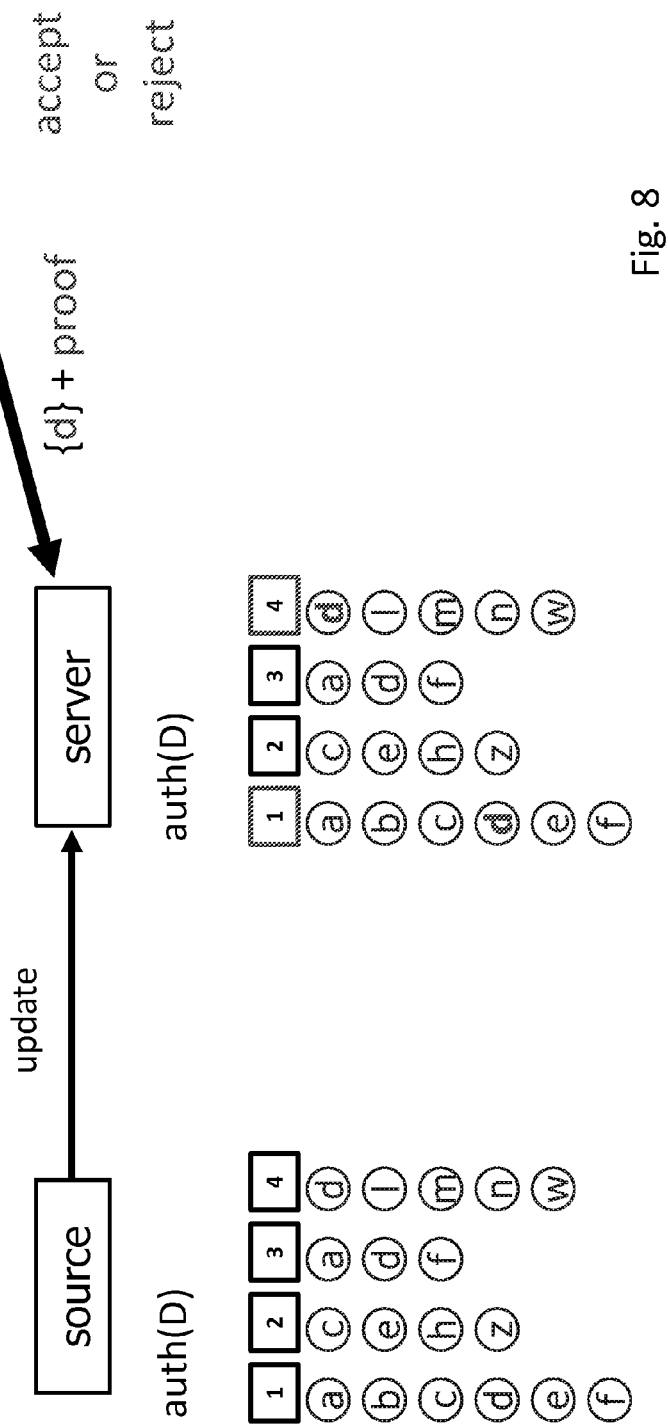
FIG. 8 shows a step where a client, Bob, queries the untrusted server and receives an answer and a proof.
Figure 9:
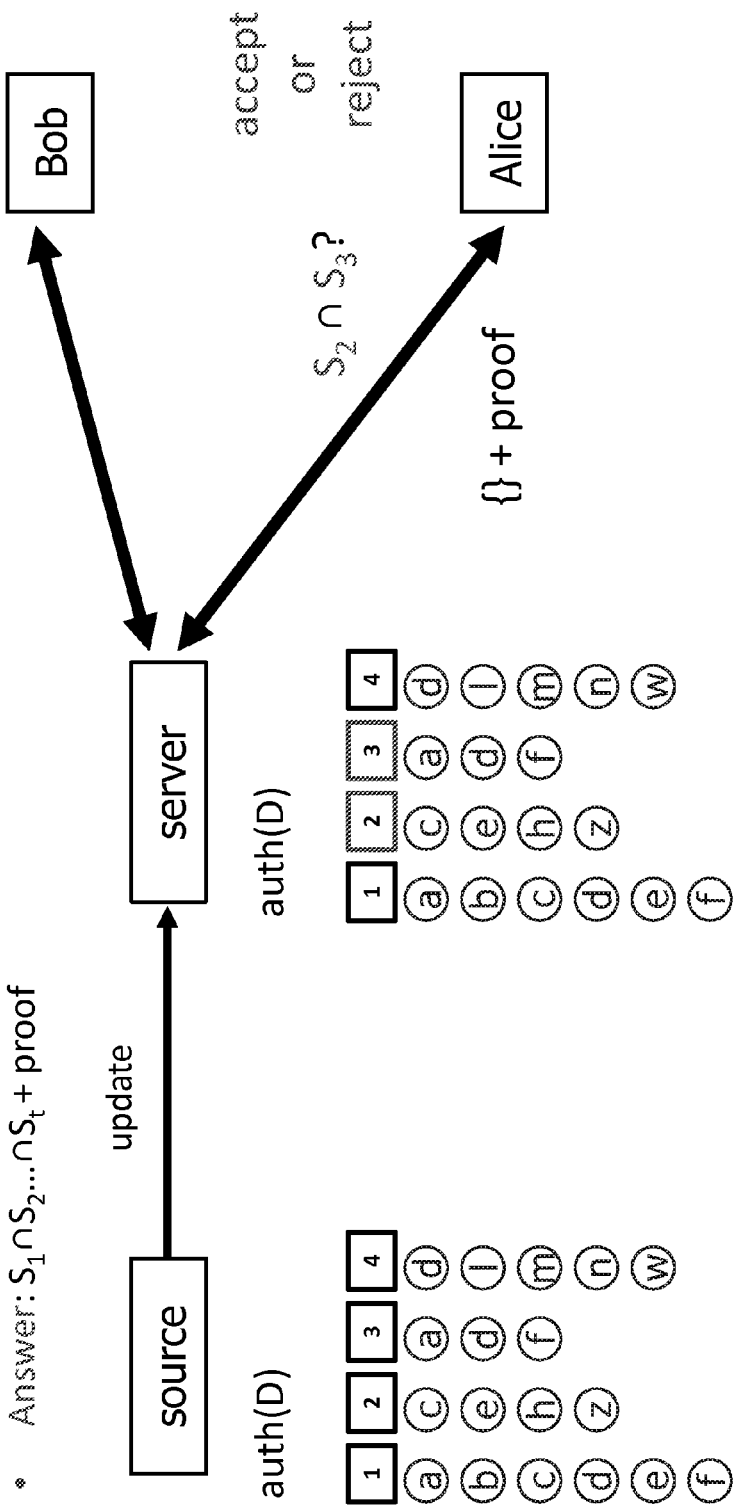
FIG. 9 shows a step where a client, Alice, queries the untrusted server and receives an answer and a proof
Figure 10:
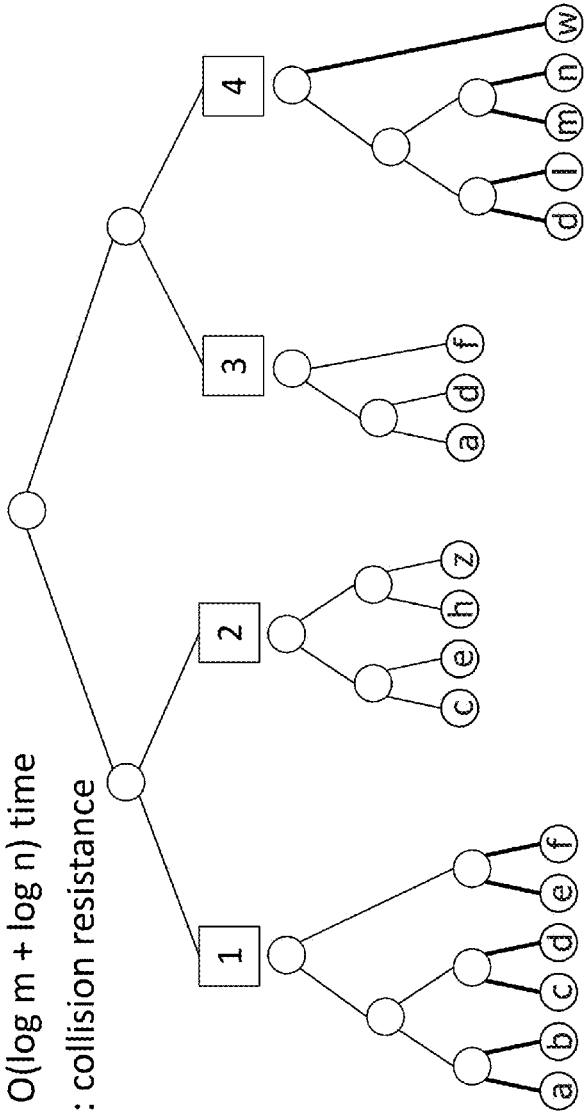
FIG. 10 shows a two level tree structure created to contain the digest and proof.
Figure 11:
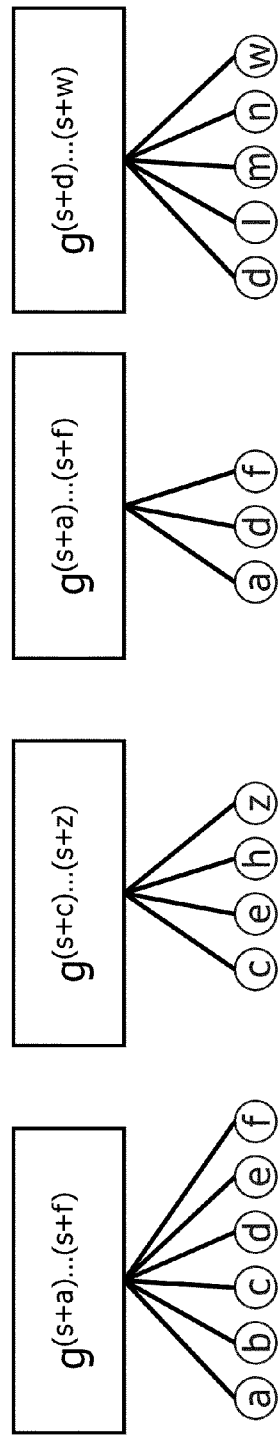
FIG. 11 shows a step in building a digest of the collection of sets by calculating an accumulation value for every set.
Figure 12:
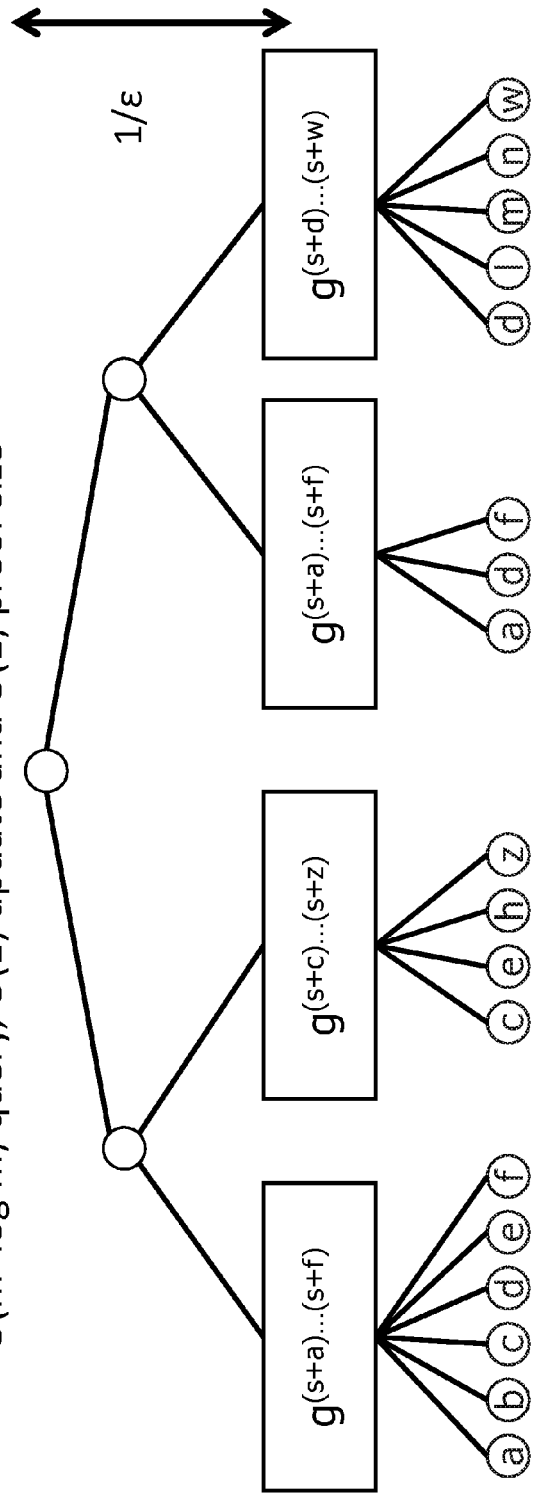
FIG. 12 shows a step in building a digest of the collection of sets by building an accumulation tree containing the accumulation value of every set in the collection of sets that was previously calculated.
Figure 13:
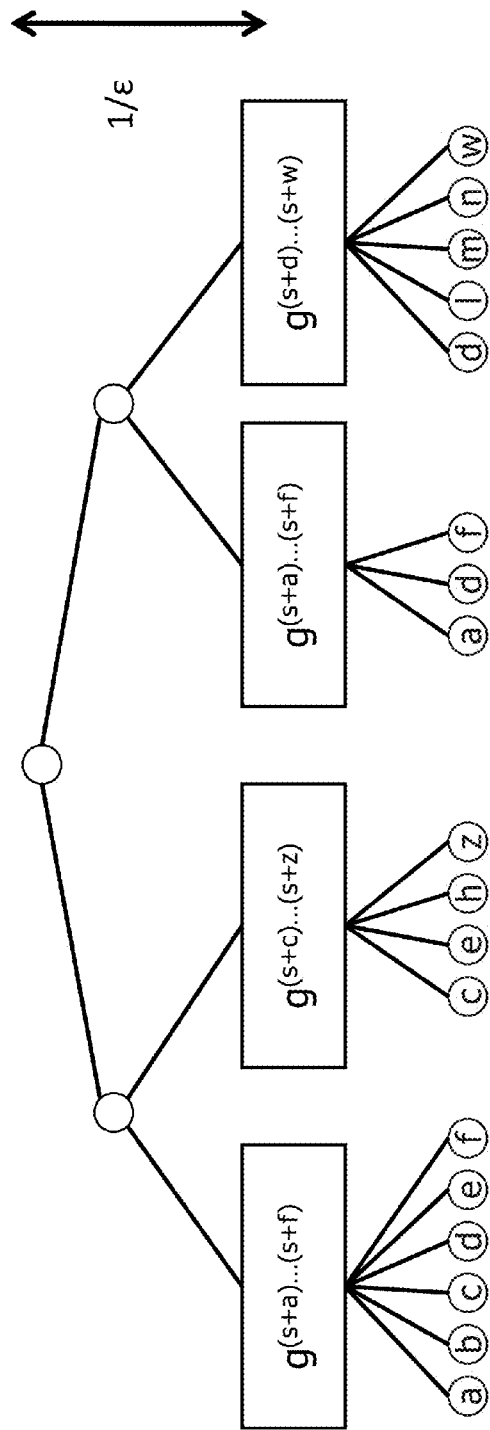
FIG. 13 shows a first step in the proof of finding the answer in the digest.
Figure 14:
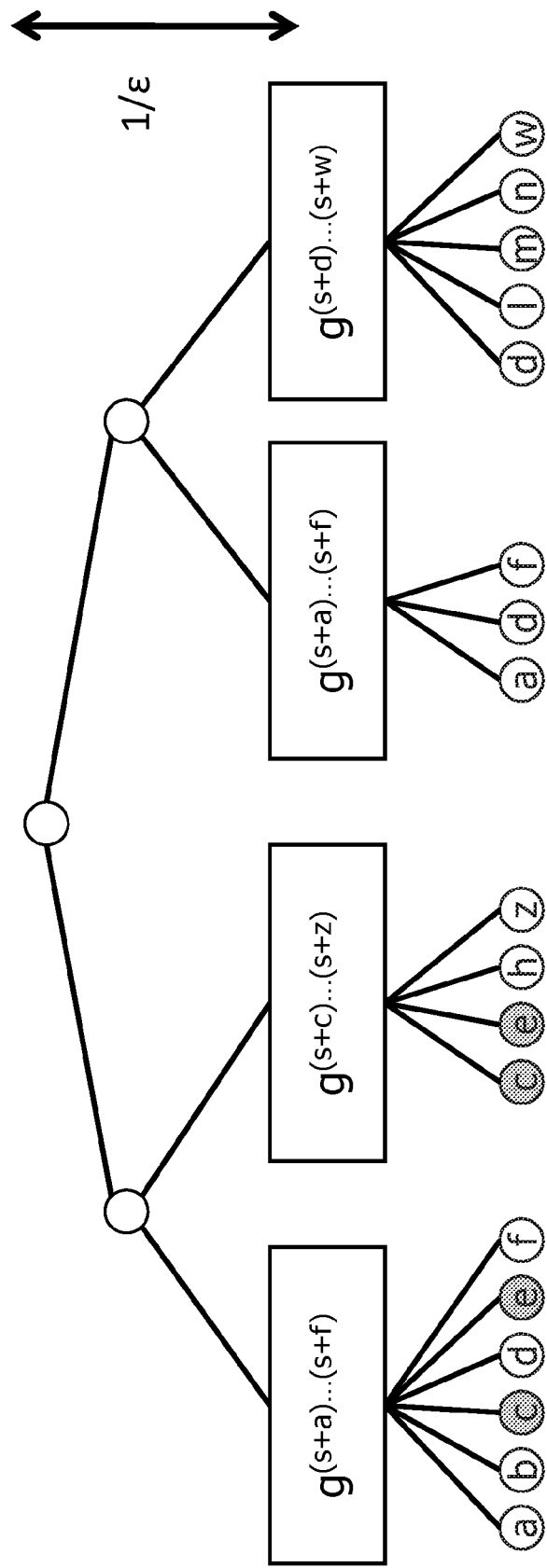
FIG. 14 shows a second step in the proof of finding the answer in the digest.

Protocols. As mentioned in the introduction, our ADS scheme ASC can be used by a verification protocol in the three-party model [36] (See FIG. 2). Here, referring to FIG. 5, a trusted entity, called source, owns a sets collection data structure $D_h$, but desires to outsource query answering, in a trustworthy (verifiable) way. As shown in FIG. 6, the source runs genkey and setup and outputs the authenticated data structure auth($D_h$) along with the digest $d_h$. The source subsequently signs the digest $d_h$, and it outsources auth($D_h$), $D_h$, the digest $d_h$ and its signature to some untrusted entities, called servers as shown in FIG. 7. On input a data structure query q (e.g., an intersection query) sent by clients, the servers use auth($D_h$) and $D_h$ to compute proofs Π(q), by running algorithm query, and they return to the clients Π(q) and the signature on $d_h$ along with the answer α(q) to q (See FIGS. 8 and 9). Clients can verify these proofs Π(q) by running algorithm verify (since they have access to the signature of $d_h$, they can verify that $d_h$ is authentic). When there is an update in the data structure (issued by the source), the source uses algorithm update to produce the new digest $d'_h$ to be used in next verifications, while the servers update the authenticated data structure through refresh.

Figure 2:
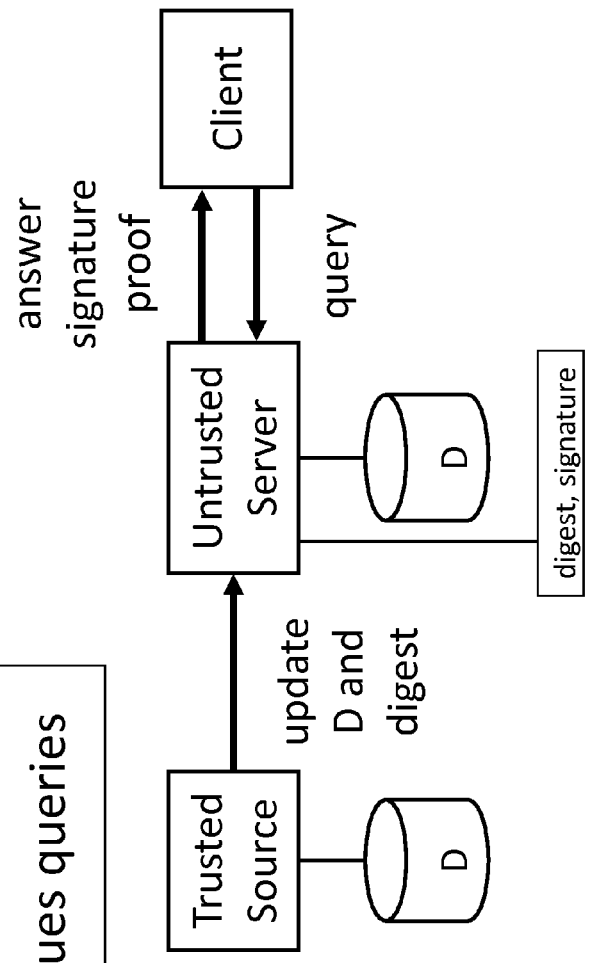
FIG. 2 shows a flow chart of a three-party implementation of the method and system of the present invention where the trusted source is distinct from the client.

Additionally, our ADS scheme ASC can also be used by a non-interactive verification protocol in the two-party model [30] as shown in FIG. 2. In this case, the source and the client coincide, i.e., the client issues both the updates and the queries, and it is required to keep only constant state, i.e., the digest of the authenticated data structure. Whenever there is an update by the client, the client retrieves a verifiable, constant-size portion of the authenticated data structure that is used for locally performing the update and for computing the new local state, i.e., the new digest. A non-interactive two-party protocol that uses an ADS scheme for a data structure D is directly comparable with the recent protocols for verifiable computing [12, 16] for the functionalities offered by the data structure D, e.g., computation of intersection, union, etc. Due to space limitations, we defer the detailed description of these protocols to the full version of the paper.

Figure 3:
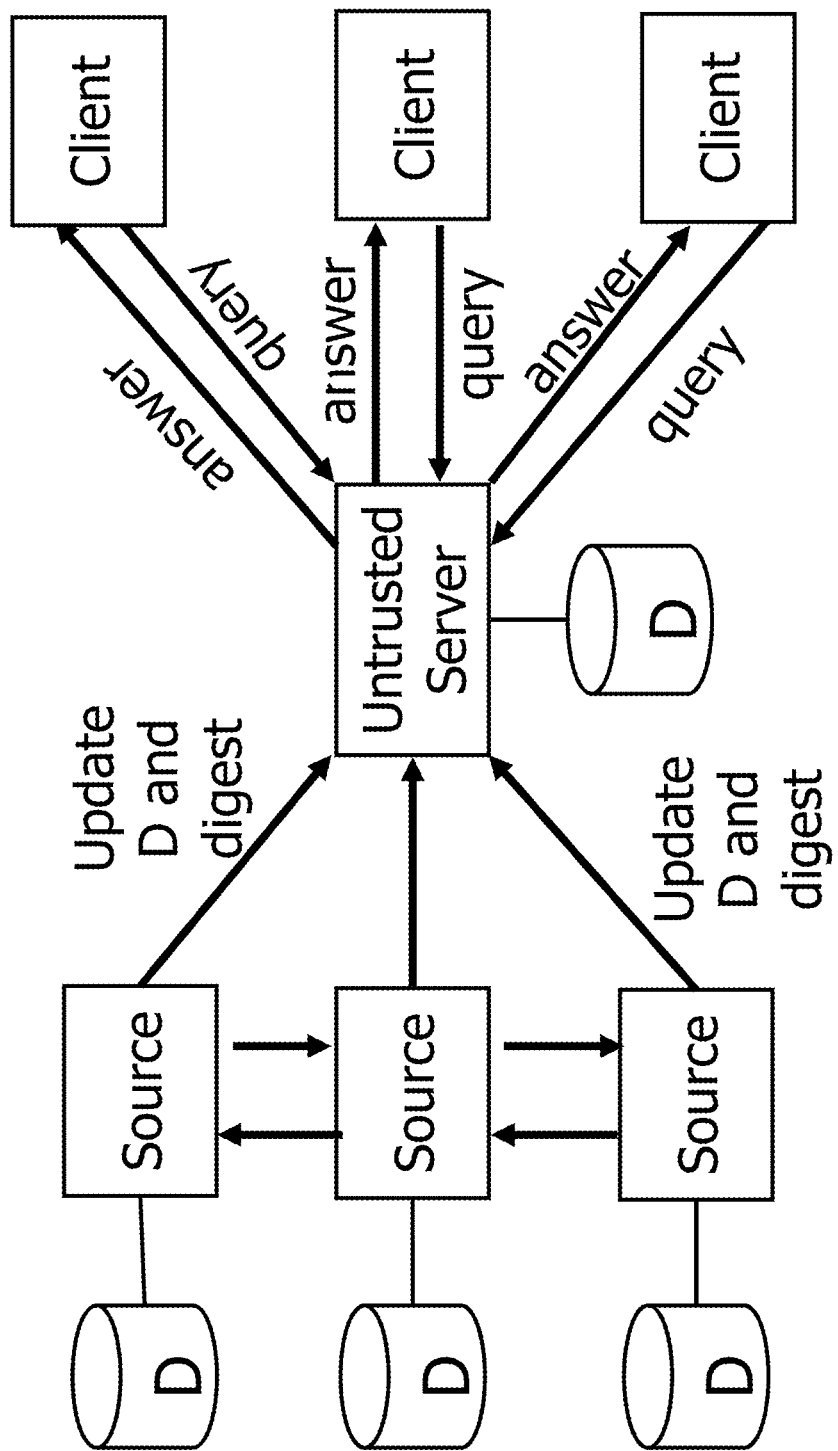
FIG. 3 shows a flow chart of a multi-party implementation of the method and system of the present invention where there are multiple trusted sources and multiple clients.

Furthermore, our ADS scheme ASC can also be used by a non-interactive verification protocol in the multi-party model [30] as shown in FIG. 3. That is, where there is more than one trusted source. In this instance, the multiple sources must synchronize together whenever there is an update by one of them to the server in order that they maintain a consistent collection of sets and can produce a digest that is verifiable across all sets.

Figure 4:
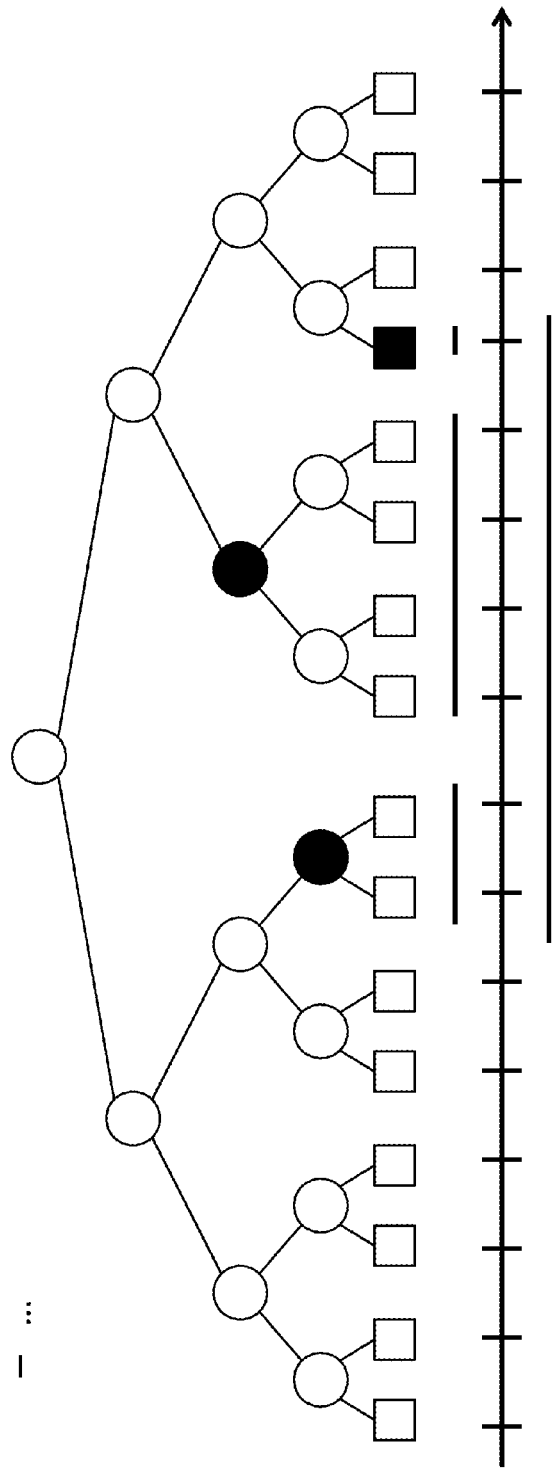
FIG. 4 shows a flow chart of an implementation where timestamps may be transformed into an intersection of keyword queries.
Figure 5:
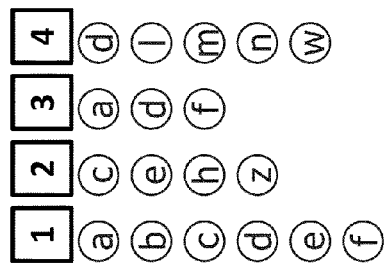
FIG. 5 shows a step where the trusted source owns sets collections.

Applications. First of all, our scheme can be used to verify keyword-search queries implemented by the inverted index data structure [4]: Each term in the dictionary corresponds to a set in our sets collection data structure which contains all the documents that include this term. A usual text query for terms $m_1$ and $m_2$ returns those documents that are included in both the sets that are represented by $m_1$ and $m_2$, i.e., their intersection. Moreover, the derived authenticated inverted index can be efficiently updated as well. However, sometimes in keyword searches (e.g., keyword searches in the email inbox) it is desirable to introduce a "second" dimension: For example, a query could be "return entails that contain terms $m_1$ and $m_2$ and which were received between time $t_1$ and $t_2$", where $t_1 < t_2$. We call this variant a timestamped keyword-search, which is shown in FIG. 4. One solution for verifying such queries could be to embed a timestamp in the documents (e.g., each email message) and have the client do the filtering locally, after he has verified—using our scheme—the intersection of the sets that correspond to terms $m_1$ and $m_2$. However, this approach is not operation-sensitive: The intersection can be bigger than the set output after the local filtering, making this solution inefficient. To overcome this inefficiency, we can use a segment-tree data structure [35], verifying in this way timestamped keyword-search queries efficiently with O(t log r+δ) complexity, where r is the total number of timestamps we are supporting. This involves building a binary tree T on top of sets of messages sent at certain timestamps and requiring each internal node of T be the union of messages stored in its children. Finally, our method can be used for verifying equi-join queries over relational tables, which boil down to set intersections.

6.4 Conclusion

In this paper, we presented an authenticated data structure for the optimal verification of set operations. The achieved efficiency is mainly due to new, extended security properties of accumulators based on pairing-based cryptography. Our solution provides two important properties, namely public verifiability and dynamic updates, as opposed to existing protocols in the verifiable computing model that provide generality and secrecy, but verifiability in a static, secret-key setting only.

A natural question to ask is whether outsourced verifiable computations with secrecy and efficient dynamic updates are feasible. Analogously, it is interesting to explore whether other specific functionalities (beyond set operations) can be optimally and publicly verified. Finally, according to a recently proposed definition of optimality [33], our construction is nearly optimal: verification and updates are optimal, but not queries. It is interesting to explore whether an optimal authenticated sets collection data structure exists, i.e., one that asymptotically matches the bounds of the plain sets collection data structure, reducing the query time from $O(N \log^2 N)$ to $O(N)$.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

REFERENCES

[1] B. Applebaum, Y. Ishai, and E. Kushilevitz. From secrecy to soundness: Efficient verification via secure computation. In *Int. Colloquium on Automata, Languages and Programming (ICALP)*, pp. 152-163, 2010.

[2] M. J. Atallah, Y. Cho, and A. Kundu. Efficient data authentication in an environment of untrusted third-party distributors. In *Int. Conference on Data Engineering (ICDE)*, pp. 696-704, 2008.

[3] M. H. Au, P. P. Tsang, W. Susilo, and Y. Mu. Dynamic universal accumulators for DDH groups and their application to attribute-based anonymous credential systems. In *RSA, Cryptographers' Track (CT-RSA)*, pp. 295-308, 2009.

[4] R. Baeza-Yates and B. Ribeiro-Neto. *Modern Information Retrieval*. Addison-Wesley Publishing Company, Reading, Mass., 1999.

[5] M. Bellare and D. Micciancio. A new paradigm for collision-free hashing: Incrementality at reduced cost. In *Advances in Cryptology (EUROCRYPT)*, pp. 163-192, 1997.

[6] S. Benabbas, R. Gennaro, and Y. Vahlis. Verifiable delegation of computation over large datasets. In *Int. Cryptology Conference (CRYPTO)*, 2011.

[7] M. Blum, W. S. Evans, P. Gemmell, S. Kannan, and M. Naor. Checking the correctness of memories. *Algorithmica*, 12(2/3):225-244, 1994.

[8] D. Boneh and X. Boyen. Short signatures without random oracles and the SDH assumption in bilinear groups. *J. Cryptology*, 21(2):149-177, 2008.

[9] D. Boneh and B. Waters. Conjunctive, subset, and range queries on encrypted data. In *Theoretical Cryptography Conference (TCC)*, pp. 535-554, 2007.

[10] S. Canard and A. Gouget. Multiple denominations in e-cash with compact transaction data. In *Financial Cryptography (FC)*, pp, 82-97, 2010.

[11] K.-M. Chung, Y. Kalai, F.-H. Liu, and R. Raz. Memory delegation. In *Int. Cryptology Conference (CRYPTO)*, 2011.

[12] K.-M. Chung, Y. Kalai, and S. Vadhan. Improved delegation of computation using fully homomorphic encryption. In *Int. Cryptology Conference (CRYPTO)*, pp. 483-501, 2010.

[13] I. Damgård and N. Triandopoulos. Supporting non-membership proofs with bilinear-map accumulators. Cryptology ePrint Archive, Report 2008/538, 2008. http://eprint.iacr.org/.

[14] C. Dwork, M. Naor, G. N. Rothblum, and V. Vaikuntanathan. How efficient can memory checking be? In *Theoretical Cryptography Conference (TCC)*, pp. 503-520, 2009.

[15] M. J. Freedman, K. Nissim, and B. Pinkas. Efficient private matching and set intersection. In *Advances in Cryptology (EUROCRYPT)*, pp. 1-19, 2004.

[16] R. Gennaro, C. Gentry, and B. Parno. Non-interactive verifiable computing: Outsourcing computation to untrusted workers. In *Int. Cryptology Conference (CRYPTO)*, pp. 465-482, 2010.

[17] M. T. Goodrich, R. Tamassia, and J. Hasic. An efficient dynamic and distributed cryptographic accumulator. In *Information Security Conference (ISC)*, pp. 372-388, 2002.

[18] M. T. Goodrich, R. Tamassia, and A. Schwerin. Implementation of an authenticated dictionary with skip lists and commutative hashing. In *DARPA Information Survivability Conference and Exposition II (DISCEX II)*, pp. 68-82, 2001.

[19] M. T. Goodrich, R. Tamassia, and N. Triandopoulos. Super-efficient verification of dynamic outsourced databases. In *RSA, Cryptographers' Track (CT-RSA)*, pp. 407-424, 2008.

[20] M. T. Goodrich, R. Tamassia, and N. Triandopoulos. Efficient authenticated data structures for graph connectivity and geometric search problems. *Algorithmica*, 60(3): 505-552, 2011.

[21] D. Kratsch, R. M. McConnell, K. Mehlhorn, and J. P. Spinrad. Certifying algorithms for recognizing interval graphs and permutation graphs. In *Symposium on Discrete Algorithms (SODA)*, pp. 158-167, 2003.

[22] J. Li, N. Li, and R. Xue. Universal accumulators with efficient nonmembership proofs. In *Applied Cryptography and Network Security (ACNS)*, pp. 253-269, 2007.

[23] C. Martel, G. Nuckolls, P. Devanbu, M. Gertz, A. Kwong, and S. G. Stubblebine. A general model for authenticated data structures. *Algorithmica*, 39(1):21-41, 2004.

[24] R. C. Merkle. A certified digital signature. In *Int. Cryptology Conference (CRYPTO)*, pp. 218-238, 1989.

[25] Y. Minsky, A. Trachtenberg, and R. Zippel. Set reconciliation with nearly optimal communication complexity. *IEEE Transactions on Information Theory*, 49(9):2213-2218, 2003.

[26] R. Morselli, S. Bhattacharjee, J. Katz, and P. J. Keleher. Trust-preserving set operations. In *Int. Conference on Computer Communications (INFOCOM)*, 2004.

[27] M. Naor and K. Nissim. Certificate revocation and certificate update. In *USENIX Security Symposium*, pp. 217-228, 1998.

[28] L. Nguyen. Accumulators from bilinear pairings and applications. In *RSA, Cryptographers' Track (CT-RSA)*, pp. 275-292, 2005.

[29] H. Pang and K.-L. Tan. Authenticating query results in edge computing. In *Int. Conference on Data Engineering (ICDE)*, pp. 560-571, 2004.

[30] C. Papamanthou and R. Tamassia. Time and space efficient algorithms for two-party authenticated data structures. In *Int. Conference on Information and Communications Security (ICICS)*, pp. 1-15, 2007.

[31] C. Papamanthou and R. Tamassia. Cryptography for efficiency: Authenticated data structures based on lattices and parallel online memory checking. Cryptology ePrint Archive, Report 2011/102, 2011. http://eprint.iacr.org/.

[32] C. Papamanthou, R. Tamassia, and N. Triandopoulos. Authenticated hash tables. In *Int. Conference on Computer and Communications Security (CCS)*, pp. 437-448, 2008.

[33] C. Papamanthou, R. Tamassia, and N. Triandopoulos. Optimal authenticated data structures with muitilinear forms. In *Int. Conference on Pairing-Based Cryptography (PAIRING)*, pp. 246-264, 2010.

[34] F. P. Preparata and D. V. Sarwate. Computational complexity of Fourier transforms over finite fields. *Mathematics of Computation*, 31(139):pp. 740-751, 1977.

[35] F. P. Preparata and M. I. Shamos. *Computational Geometry: An Introduction*. Springer-Verlag, New York, N.Y., 1985.

[36] R. Tamassia. Authenticated data structures. In *European Symp. on Algorithms (ESA)*, pp. 2-5, 2003.

[37] R. Tamassia and N. Triandopoulos. Certification and authentication of data structures. In *Alberto Mendelzon Workshop on Foundations of Data Management*, 2010.

[38] Y. Yang, D. Papadias, S. Papadopoulos, and P. Kalnis. Authenticated join processing in outsourced databases. In *Int. Conf. on Management of Data (SIGMOD)*, pp. 5-18, 2009.

[39] M. L. Yiu, Y. Lin and K. Mouratidis. Efficient verification of shortest path search via authenticated hints. In *Int. Conference on Data Engineering (ICDE)*, pp. 237-248, 2010.

What is claimed is:

1. A computer implemented method of verifying set operations on a dynamic collection of sets performed by an untrusted server, comprising:
   providing a dynamic collection of sets from a trusted source stored on an untrusted server;
   providing a security parameter based on the dynamic selection of sets;
   calculating a secret key and a public key based on the security parameter;
   calculating a digest of the dynamic collection of sets using the secret key and public key;
   providing a public key and digest to a client;
   performing a set operation query on the dynamic collection of sets;
   determining an answer to the set operation query on the dynamic collection of sets;
   creating a proof of the answer to the set operation query;
   returning the answer and proof to the client; and
   verifying the answer by using the public key and digest to check the proof.

2. The method of claim 1, wherein the client and trusted source are the same.

3. The method of claim 1, wherein the client and trusted source are different.

4. The method of claim 1, wherein the set operation query consisting essentially of the group selected from the primitive set operations of union, intersection, set difference, and subset.

5. The method of claim 1, wherein the proof is returned in an accumulation tree representing the answer to the set operation query performed on the dynamic collection of sets.

6. The method of claim 5, wherein the proof further contains subset witnesses.

7. The method of claim 5, wherein the proof further contains completeness witnesses.

8. The method of claim 5, wherein the proof further contains membership witnesses.

9. The method of claim 5, wherein the proof further contains accumulation-value correctness witnesses.

10. The method of claim 1, wherein the proof verifies the correctness of the answer with respect to the digest.

11. The method of claim 1, wherein the set operation query is based on a keyword search on a collection of documents.

12. The method of claim 11, wherein the keyword search comprises timestamps.

13. The method of claim 1, wherein the set operation query is based on database records.

14. The method of claim 1, wherein the digest is constructed by applying hierarchically over the dynamic collection of sets, an accumulator tree formed through bilinear-map accumulators and collision-resistant hashing.

15. A computer implemented method of verifying set operations on a dynamic collection of sets performed by an untrusted server, comprising:
   providing a dynamic selection of sets from a trusted source stored on an untrusted server;
   providing a security parameter based on the dynamic selection of sets;
   calculating a secret key and a public key based on the security parameter;
   calculating a digest of the dynamic collection of sets containing a set of all possible sets in the dynamic collection of sets using the secret key and public key, said digest constructed by applying hierarchically over the dynamic collection of sets, an accumulator tree formed through bilinear-map accumulators and collision-resistant hashing;

providing a public key and digest to a client;

performing a set operation query on the dynamic collection of sets;

determining an answer to the set operation query on the dynamic collection of sets;

creating a proof of the answer to the set operation query, said proof having a polynomial representing the answer to the set operation query performed on the dynamic collection of sets, said polynomial stored as an accumulation tree of the answer;

returning the answer and proof to the client; and verifying the answer by using the public key and digest to check the proof by calculating the coefficients of a polynomial by determining if the nodes of the accumulation tree in the answer are in the accumulation tree of the digest.

16. The method of claim 15, wherein the set operation query consisting essentially of the group selected from the primitive set operations of union, intersection, set difference, and subset.

17. The method of claim 15, wherein the proof is returned in an accumulation tree representing the answer to the set operation query performed on the dynamic collection of sets.

18. The method of claim 17, wherein the proof further contains subset witnesses.

19. The method of claim 17, wherein the proof further contains completeness witnesses.

20. The method of claim 17, wherein the proof further contains membership witnesses.

21. The method of claim 17, wherein the proof further contains accumulation-value correctness witnesses.

22. The method of claim 15, wherein the proof verifies the correctness of the answer with respect to the digest.

23. The method of claim 15, wherein the set operation query is based on a keyword search on a collection of documents.

24. The method of claim 23, wherein the keyword search comprises timestamps.

25. The method of claim 15, wherein the set operation query is based on database records.

26. A system for verifying set operations on a dynamic collection of sets performed by an untrusted server, comprising:

an untrusted server hosting a dynamic collection of sets, a digest of the dynamic collection of sets and a public key provided by a trusted source, said untrusted server configured and arranged to receive a set operation query for elements in the dynamic collection of sets, and further configured and arranged to construct and return an answer to the set operation query, a proof and a digest of the dynamic collection of sets;

at least one client configured and arranged to transmit queries to the untrusted server for elements of the dynamic collection of sets, said client further configured and arranged to receive the answer, digest and a proof transmitted by the untrusted server, and further configured and arranged to verify the answer using the public key, digest and proof;

said digest of the dynamic collection of sets calculated of the dynamic collection of sets, public key and secret key; and said secret key and public key calculated from a security parameter based on the dynamic collection of sets.

27. The system of claim 26, wherein the trusted source is a plurality of synchronized trusted sources.

28. The system of claim 26, wherein the client and trusted source are the same.

29. The system of claim 26, wherein the client and trusted source are the different.

30. The system of claim 26, wherein the server is configured and arranged to receive set operation queries consisting essentially of the group selected from the primitive set operations of union, intersection, set difference, and subset.

31. The system of claim 26, wherein the proof is returned in an accumulation tree representing the answer to the set operation query performed on the dynamic collection of sets.

32. The system of claim 31, wherein the proof further contains subset witnesses.

33. The system of claim 31, wherein the proof further contains completeness witnesses.

34. The system of claim 31, wherein the proof further contains membership witnesses.

35. The system of claim 31, wherein the proof further contains accumulation-value correctness witnesses.

36. The system of claim 26, wherein the set operation query is based on a keyword search on a collection of documents.

37. The system of claim 26, wherein the keyword search comprises timestamps.

38. The system of claim 26, wherein the set operation query is based on database records.

39. The system of claim 26, wherein the digest is constructed by applying hierarchically over the dynamic collection of sets, an accumulator tree formed through bilinear-map accumulators and collision-resistant hashing.

* * * * *